(12) United States Patent
Regunathan et al.

(10) Patent No.: US 8,724,916 B2
(45) Date of Patent: May 13, 2014

(54) REDUCING DC LEAKAGE IN HD PHOTO TRANSFORM

(71) Applicant: Microsoft Corporation, Redmond, WA (US)

(72) Inventors: Shankar Regunathan, Bellevue, WA (US); Sridhar Srinivasan, Shanghai (CN); Shijun Sun, Redmond, WA (US); Gary J. Sullivan, Bellevue, WA (US); Chengjie Tu, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/758,798

(22) Filed: Feb. 4, 2013

(65) Prior Publication Data

US 2013/0215971 A1 Aug. 22, 2013

Related U.S. Application Data

(62) Division of application No. 12/165,474, filed on Jun. 30, 2008, now Pat. No. 8,369,638.

(60) Provisional application No. 61/130,131, filed on May 27, 2008.

(51) Int. Cl.
*G06K 9/36* (2006.01)
*H04N 7/26* (2006.01)

(52) U.S. Cl.
USPC ..................... 382/248; 375/240.18

(58) Field of Classification Search
USPC .............. 382/248, 250, 232, 233, 240, 281; 375/240.13, 240.16, 240.18, 210.19; 704/203, 503; 708/400; 348/425.2, 699
See application file for complete search history.

(56) References Cited

U.S. PATENT DOCUMENTS

| 4,698,672 A | 10/1987 | Chen et al. |
| 4,754,492 A | 6/1988 | Malvar |
| 5,297,236 A | 3/1994 | Antill et al. |
| 5,311,310 A | 5/1994 | Jozawa et al. |

(Continued)

FOREIGN PATENT DOCUMENTS

| AU | 7351001 | 1/2002 |
| EP | 0467054 | 8/1996 |

(Continued)

OTHER PUBLICATIONS

U.S. Appl. No. 60/341,674, filed Dec. 17, 2001, Lee et al.

(Continued)

*Primary Examiner* — Yon Couso
(74) *Attorney, Agent, or Firm* — Aaron Chatterjee; Andrew Sanders; Micky Minhas

(57) ABSTRACT

In certain embodiments, to eliminate DC leakage into surrounding AC values, scaling stage within a photo overlap transform operator is modified such that the off-diagonal elements of the associated scaling matrix have the values of 0. In certain embodiments, the on-diagonal scaling matrix are given the values (0.5, 2). In some embodiments, the scaling is performed using a combination of reversible modulo arithmetic and lifting steps. In yet other embodiments, amount of DC leakage is estimated at the encoder, and preprocessing occurs to mitigate amount of leakage, with the bitstream signaling that preprocessing has occurred. A decoder may then read the signal and use the information to mitigate DC leakage.

14 Claims, 19 Drawing Sheets

(56) References Cited

U.S. PATENT DOCUMENTS

| | | | |
|---|---|---|---|
| 5,384,849 A | | 1/1995 | Jeong |
| 5,440,130 A | * | 8/1995 | Cox et al. .................. 250/370.09 |
| 5,805,739 A | | 9/1998 | Malvar et al. |
| 5,822,000 A | | 10/1998 | Yoon |
| 5,850,294 A | | 12/1998 | Apostolopoulos et al. |
| 5,859,788 A | | 1/1999 | Hou |
| 5,933,522 A | | 8/1999 | Sugimoto |
| 5,933,541 A | | 8/1999 | Kutka et al. |
| 5,970,173 A | | 10/1999 | Lee et al. |
| 5,973,755 A | | 10/1999 | Gabriel |
| 5,982,459 A | | 11/1999 | Fandrianto et al. |
| 5,999,656 A | | 12/1999 | Zandi et al. |
| 6,011,625 A | | 1/2000 | Glass |
| 6,029,126 A | | 2/2000 | Malvar |
| 6,038,580 A | | 3/2000 | Yeh |
| 6,064,776 A | | 5/2000 | Kikuchi et al. |
| 6,073,153 A | | 6/2000 | Malvar |
| 6,101,279 A | | 8/2000 | Nguyen et al. |
| 6,115,689 A | | 9/2000 | Malvar |
| 6,154,762 A | | 11/2000 | Malvar |
| 6,219,458 B1 | | 4/2001 | Zandi et al. |
| 6,249,610 B1 | | 6/2001 | Matsumoto et al. |
| 6,253,165 B1 | | 6/2001 | Malvar |
| 6,307,887 B1 | | 10/2001 | Gabriel |
| 6,324,560 B1 | | 11/2001 | Malvar |
| 6,337,881 B1 | | 1/2002 | Chaddha |
| 6,370,502 B1 | | 4/2002 | Wu et al. |
| 6,377,916 B1 | | 4/2002 | Hardwick |
| 6,393,061 B1 | | 5/2002 | Owechko |
| 6,393,156 B1 | | 5/2002 | Nguyen et al. |
| 6,421,464 B1 | | 7/2002 | Tran et al. |
| 6,487,574 B1 | | 11/2002 | Malvar |
| 6,496,795 B1 | | 12/2002 | Malvar |
| 6,728,315 B2 | | 4/2004 | Haskell et al. |
| 6,728,316 B2 | | 4/2004 | Enficiaud et al. |
| 6,763,068 B2 | | 7/2004 | Oktem |
| 6,771,828 B1 | | 8/2004 | Malvar |
| 6,771,829 B1 | | 8/2004 | Topiwala et al. |
| 6,832,232 B1 | | 12/2004 | Hus et al. |
| 6,865,229 B1 | | 3/2005 | Pronkine |
| 7,006,699 B2 | | 2/2006 | Malvar |
| 7,027,654 B1 | | 4/2006 | Ameres et al. |
| 7,050,504 B2 | | 5/2006 | Joch et al. |
| 7,106,797 B2 | | 9/2006 | Malvar |
| 7,110,610 B2 | | 9/2006 | Malvar |
| 7,116,834 B2 | | 10/2006 | Malvar |
| 7,120,297 B2 | | 10/2006 | Simard |
| 7,155,065 B1 | | 12/2006 | Malvar |
| 7,167,522 B2 | | 1/2007 | Webb |
| 7,181,403 B2 | | 2/2007 | Wu et al. |
| 7,275,036 B2 | | 9/2007 | Geiger et al. |
| 7,305,139 B2 | | 12/2007 | Srinivasan et al. |
| 7,315,822 B2 | | 1/2008 | Li |
| 7,376,266 B2 | | 5/2008 | Simard |
| 7,412,102 B2 | | 8/2008 | Srinivasan et al. |
| 7,428,342 B2 | | 9/2008 | Tu et al. |
| 7,460,993 B2 | | 12/2008 | Chen et al. |
| 7,471,726 B2 | | 12/2008 | Srinivasan |
| 7,471,850 B2 | | 12/2008 | Srinivasan |
| 7,551,789 B2 | | 6/2009 | Tu et al. |
| 8,369,638 B2 | | 2/2013 | Regunathan et al. |
| 2002/0110280 A1 | | 8/2002 | Prakash et al. |
| 2002/0118748 A1 | | 8/2002 | Inomata et al. |
| 2002/0118759 A1 | | 8/2002 | Enficiaud et al. |
| 2003/0128756 A1 | | 7/2003 | Oktem |
| 2003/0152146 A1 | | 8/2003 | Lin |
| 2003/0185439 A1 | | 10/2003 | Malvar |
| 2003/0187634 A1 | | 10/2003 | Li |
| 2003/0206582 A1 | | 11/2003 | Srinivasan |
| 2004/0047512 A1 | | 3/2004 | Handley et al. |
| 2004/0057631 A1 | | 3/2004 | Kim |
| 2004/0167757 A1 | | 8/2004 | Strujs |
| 2004/0170302 A1 | | 9/2004 | Museth et al. |
| 2005/0013359 A1 | | 1/2005 | Srinivasan |
| 2005/0083216 A1 | | 4/2005 | Lin |
| 2005/0231396 A1 | | 10/2005 | Dunn |
| 2005/0286795 A1 | | 12/2005 | Zhang |
| 2006/0114993 A1 | | 6/2006 | Xiong et al. |
| 2006/0133682 A1 | | 6/2006 | Tu et al. |
| 2006/0133683 A1 | * | 6/2006 | Srinivasan .................. 382/250 |
| 2006/0133684 A1 | | 6/2006 | Srinivasan et al. |
| 2006/0291734 A1 | | 12/2006 | Hou |
| 2006/0291735 A1 | | 12/2006 | Hou |
| 2006/0291736 A1 | | 12/2006 | Hou |
| 2006/0293881 A1 | | 12/2006 | Hou |
| 2007/0036224 A1 | | 2/2007 | Srinivasan |
| 2008/0075377 A1 | | 3/2008 | Topiwala et al. |
| 2008/0137982 A1 | | 6/2008 | Nakajima |
| 2008/0198936 A1 | | 8/2008 | Srinivasan |
| 2009/0299754 A1 | | 12/2009 | Mehrotra |

FOREIGN PATENT DOCUMENTS

| | | |
|---|---|---|
| EP | 1202219 | 5/2002 |
| EP | 1 672 929 | 6/2006 |
| JP | 05-083141 | 4/1993 |
| JP | 5-091459 | 4/1993 |
| JP | 6-290262 | 10/1994 |
| JP | 11-088701 | 3/1999 |
| JP | 11-203271 | 7/1999 |
| JP | 2002-182693 | 6/2002 |
| JP | 2002-304624 | 10/2002 |
| JP | 2003-283840 | 10/2003 |
| JP | 2003-298846 | 10/2003 |
| JP | 2003-324757 | 11/2003 |
| JP | 2004-201047 | 7/2004 |
| KR | 10-2004-0050888 | 6/2004 |
| KR | 10-2006-0083125 | 7/2006 |
| KR | 10-2006-0092826 | 8/2006 |
| KR | 10-0676226 | 1/2007 |
| RU | 2194361 | 12/2002 |
| WO | WO 02/07438 | 1/2002 |
| WO | WO 03/038752 | 5/2003 |
| WO | WO 03/053066 | 6/2003 |
| WO | WO 2007/021615 A3 | 2/2007 |
| WO | WO 2008/057308 | 5/2008 |

OTHER PUBLICATIONS

U.S. Appl. No. 60/488,710, filed Jul. 18, 2003, Srinivasan et al.

Adams, "Generalized Reversible Integer-to-Integer Transform Framework," 2003 IEEE Pacific Rim Conference on Communications, Computers, and Signal Processing, vol. 2, Aug. 2003, pp. 1000-1003.

Ahmed et al., "Discrete Cosine Transform," *IEEE Transactions on Computers*, C-23 (Jan. 1974), pp. 90-93.

Apostolopoulos et al., "Post-processing for very low bit-rate video compression," *IEEE Trans. Image Processing*, vol. 8, pp. 1125-1129 (Aug. 1999).

Arai et al., "A Fast DCT-SQ Scheme for Images," The Trans. of the IEICE, vol. E 71, No. 11, pp. 1095-1097 (Nov. 1988).

Bhaskaran et al., "Image and Video Compression Standards Algorithms and Architectures," 2nd ed., 1997, pp. 192-194.

Cham, "Development of integer cosine transforms by the principle of dyadic symmetry," IEE Proc., vol. 136, Pt. 1, No. 4, pp. 276-282 (Aug. 1989).

Chen et al., "A Fast Computational Algorithm for the Discrete Cosine Transform," IEEE Trans. on Communications, vol. COM-25, No. 9, pp. 1004-1009 (Sep. 1977).

Chen et al., "Integer Reversible Transformation to Make JPEG Lossless," *IEEE Int'l Conf. on Signal Processing*, vol. 1, pp. 835-838 (Aug. 2004).

Chen et al., "*M*-Channel Lifting Factorization of Perfect Reconstruction Filter Banks and Reversible *M*-Band Wavelet Transforms," *IEEE Trans. on Circuits and Systems II: Analog and Digital Signal Processing*, vol. 50, No. 12, pp. 963-976 (Dec. 2003).

Cheng et al., "New family of lapped biorthogonal transform via lifting steps," *IEE Proc. Vision, Image and Signal Processing*, vol. 149, No. 2, pp. 91-96 (Apr. 2002).

Costa et al., "Efficient Run-Length Encoding of Binary Sources with Unknown Statistics", Technical Report No. MSR-TR-2003-95, pp. 1-10, Microsoft Research, Microsoft Corporation (Dec. 2003).

(56) References Cited

OTHER PUBLICATIONS de Queiroz et al., "Lapped transforms for image compression," *The Handbook on Transforms and Data Compression*, CRC Press, pp. 197-265 (Oct. 2000).
de Queiroz et al., "Time-Varying Lapped Transforms and Wavelet Packets," *IEEE Transactions on Signal Processing*, vol. 41, No. 12, pp. 3293-3305 (1993).
Fukuma et al., "Lossless 8-point fast discrete cosine transform using lossless hadamard transform," *Technical Report of IEICE*, vol. 99, No. 399, pp. 37-44 (Oct. 29, 1999).
Gangaputra et al., "Adaptive Pre- and Post-Filtering for Block Based Systems," *IEEE Int'l Conf. on Acoustics, Speech, and Signal Processing*, vol. 4, pp. IV-3297 through IV-3300 (May 2002).
Geiger et al., "IntMDCT—A Link Between Perceptual and Lossless Audio Coding," *IEEE Int'l Conf. on Acoustics, Speech, and Signal Processing*, vol. 2, 4 pp (May 2002).
Goel et al., "Pre-processing for MPEG Compression Using Adaptive Spatial Filtering," *Proceedings of 1995 IEEE International Conference on Consumer Electronics*, 1995, pp. 246-247.
Groder, "Modeling and Synthesis of the HD Photo Compression Algorithm," <http://hdl.handle.net/1850/7118>, Dept. of Computer Engineering, Rochester Institute of Technology, 115 pages (Aug. 2008).
"H.264 & IPTV Over DSL—Enabling New Telco Revenue Opportunities," *White Paper*, Intel/Envivio, available at http://www.envivio.com/images/products/H264whitepaper.pdf (May 15, 2004), 12 pp.
Hao et al., "Comparative Study of Color Transforms for Image Coding and Derivation of Integer Reversible Color Transform," *IEEE Int'l Conf. on Pattern Recognition*, vol. 3, pp. 224-227 (Sep. 2000).
Hao et al., "Matrix Factorizations for Reversible Integer Mapping," IEEE Transactions on Signal Processing, vol. 49, Issue 10, Oct. 2001, pp. 2314-2324.
Hohl, "An 8×8 Discrete Cosine Transform Implementation on the TMS320C25 or the TMS320C30," Texas Instruments Application Report SPRA115, pp. 1-25 (1990) http://focus.ti.com/lit/an/spra115/spra115.pdf [Downloaded from the World Wide Web on Dec. 28, 2005].
Hui et al., "An Integer Hierarchy Lapped Biorthogonal Transform via Lifting Steps and Application in Image Coding," *IEEE Int'l Conf. on Signal Processing*, vol. 1, pp. 664-667 (Aug. 2002).
Intel Corporation, "Using Streaming SIMD Extensions in a Fast DCT Algorithm for MPEG Encoding," Version 1.2, 11 pp. (Jan. 1999).
Intel Corporation, "Using MMX™ Instructions in a Fast iDCT Algorithm for MPEG Decoding," 21 pp. (Mar. 1996).
International Search Report for PCT/US04/28969, completed Jul. 11, 2006, 4 pp.
ISO/IEC, "ISO/IEC 11172-2: Information Technology—Coding of Moving Pictures and Associated Audio for Storage Media at up to About 1.5 Mbit/s," 122 pp. (1993).
ISO/IEC, "Information Technology—Coding of Audio-Visual Objects: Visual, ISO/IEC 14496-2, Committee Draft," 330 pp. (1998).
ISO/IEC 14496-2, "Coding of Audio-Visual Object—Part 2: Visual," Third Edition, pp. 1-727, (Jun. 2004).
ISO/IEC JTC1/SC29/WG11 N4668, "Coding of Moving Pictures and Audio," Title: MPEG-4 Overview—(V.21—Jeju Version), Editor: Rob Koenen (rob.koenen@m4if.org), available at http://www.chiariglione.org/mpeg/standards/mpeg-4/mpeg-4.htm (Mar. 2002), 66 pp.
ISO/IEC, "An integer reversible color transform," ISO/IEC JTC1/SC29/WG1 N1479, 6 pp. (Nov. 1999).
ITU-T, "ITU-T Recommendation H.261: Video Codec for Audiovisual Services at p×64 kbits," 28 pp. (1993).
ITU-T, "ITU-T Recommendation H.262: Information Technology—Generic Coding of Moving Pictures and Associated Audio Information: Video," 218 pp. (1995).
ITU-T, "ITU-T Recommendation H.263: Video Coding for Low Bit Rate Communication," 167 pp. (1998).
ITU-T Recommendation H.264, "Series H: Audiovisual and Multimedia Systems, Infrastructure of Audiovisual Services—Coding of Moving Video," International Telecommunication Union, pp. 1-262 (May 2003).
ITU-T Recommendation T.800, "Series T: Terminals for Telematic Services," International Telecommunication Union, pp. 1-194 (Aug. 2002).
Jain, "Fundamentals of Digital Image Processing," Chapters 2, 5, and 11, Prentice Hall, 189 pp. (1989).
Joint Video Team (JVT) of ISO/IEC MPEG & ITU-T VCEG, "Joint Final Committee Draft (JFCD) of Joint Video Specification," JVT-D157, 207 pp. (Aug. 2002).
Joint Video Team (JVT) of ISO/IEC MPEG & ITAU-T VCEG, "New Invertible Integer Color Transforms Based on Lifting Steps and Coding of 4:4:4 Video," JVT-I015r3, 16 pp. (Sep. 2003).
Kim et al., "A New Color Transform for RGB Coding," *Int'l Conf. on Image Processing*, pp. 107-110 (Oct. 2004).
Klausutis et al., "Variable Block Size Adaptive Lapped Transform-based Image Coding," *1997 International Conference on Image Processing (ICIP '97)*, vol. 3, pp. 686-689 (1997).
Kwan et al., "A Complete Image Compression Scheme Based on Overlapped Block Transform with Post-Processing," EURASIP Journal on Applied Signal Processing, vol. 2006, Article ID 10968, pp. 1-15 (Jan. 2006).
Li, "Low Noise Reversible MDCT (RMDCT) and Its Application in Progressive-to-Lossless Embedded Audio Coding," *IEEE Trans. on Signal Processing*, vol. 53, No. 5 (May 2005).
List et al., "Adaptive deblocking filter," *IEEE Trans. on Circuits and Systems for Video Technology*, vol. 13, No. 7, pp. 614-619 (Jul. 2003).
Malvar, "Biorthogonal and Nonuniform Lapped Transforms for Transform Coding with Reduced Blocking and Ringing Artifacts," appeared in *IEEE Transactions on Signal Processing, Special Issue on Multirate Systems, Filter Banks, Wavelets, and Applications*, vol. 46, 29 pp. (1998).
Malvar, "Extended Lapped Transforms: Fast Algorithms and Applications," ICASSP, vol. 3, pp. 1797-1800, 14-17, Apr. 1991.
Malvar, "Fast Progressive Image Coding without Wavelets", IEEE Data Compression Conference, Snowbird, Utah, 10 pp. (Mar. 2000).
Malvar, "Lapped Biorthogonal Transforms for Transform Coding with Reduced Blocking and Ringing Artifacts," *IEEE Int'l Conf. on Acoustics, Speech, and Signal Processing*, vol. 3, pp. 2421-2424 (Apr. 1997).
Malvar, "Lapped Transforms for Efficient Transform/Subband Coding," *IEEE Transactions on Acoustics, Speech and Signal Processing*, vol. 38, No. 6, pp. 969-978 (1990).
Malvar, "Signal Processing With Lapped Transforms," Norwood, MA: Artech House, pp. 175-219, 264-273, and 353-357 (1992).
Malvar, "Signal Processing with Lapped Transforms," pp. 143-173, and 265-273 (1992).
Microsoft Corporation, "Microsoft Debuts New Windows Media Player 9 Series, Redefining Digital Media on the PC," 4 pp. (Sep. 4, 2002) [Downloaded from the World Wide Web on May 14, 2004].
Mook, "Next-Gen Windows Media Player Leaks to the Web," *BetaNews*, 17 pp. (Jul. 19, 2002) [Downloaded from the World Wide Web on Aug. 8, 2003].
Muramatsu et al., "The two-dimensional lapped Hadamard transform," *IEEE Proc. on Circuits and Systems*, vol. 5, pp. 86-89 (May 1998).
Murata et al., "Fast 2D IDCT Implementation with Multimedia Instructions for a Software MPEG2 Decoder," IEEE Conf. Acoustics, Speech and Signal Processing, vol. 5, 4 pp. (May 1998).
Ostermann et al., "Video Coding with H.264/AVC", IEEE Circuits and Systems Magazine, First Quarter 2004 (retrieved on Apr. 14, 2007), retrieved from the internet <URL:http://ieeexplore.ieee.org>, 22 pp.
Paeth, "A Fast Algorithm for General Raster Rotation," *Proceedings of Graphics Interface '86*, pp. 77-81, May 1986.
Park et al., "A post processing method for reducing quantization effects in low bit-rate moving picture coding," *IEEE Trans. Circuits Syst., Video Technol.*, vol. 9, pp. 161-171 (Feb. 1999).
Printouts of FTP directories from http://ftp3.itu.ch, 8 pp. (downloaded from the World Wide Web on Sep. 20, 2005), 8 pp.

(56) References Cited

OTHER PUBLICATIONS

Proposed SMPTE Standard for Television: VC-1 Compressed Video Bitstream Format and Decoding Process, pp. 1-500, (Aug. 2005).
Rao et al., "Techniques and Standards for Image, Video, and Audio Coding," Englewood Cliffs, NJ: Prentice-Hall (1996), 21 pp.
Reader, "History of MPEG Video Compression—Ver. 4.0," 99 pp. (document marked Dec. 16, 2003).
Shlien, "The Modulated Lapped Transform, Its Time-Varying Forms, and Its Applications to Audio Coding Standards," *IEEE Transactions on Speech and Audio Processing*, vol. 5, No. 4, pp. 359-366 (Jul. 1997).
Shui et al., "*M*-Band Biorthogonal Interpolating Wavelets via Lifting Scheme," *IEEE Trans. on Signal Processing*, vol. 52, No. 9, pp. 2500-2512 (Sep. 2004).
Srinivasan, "Modulo Transforms an Alternative to Lifting," MSR-TR-2004-130, 29 pp. (document marked Jan. 10, 2005).
Srinivasan, "Reversible Image Rotations with Modulo Transforms," *IEEE Image Processing*, vol. 2, pp. 137-140 (Sep. 2005).
Srinivasan et al., "Windows Media Video 9: overview and applications," *Signal Processing Image Communication*, vol. 19, No. 9, pp. 851-875 (Oct. 2004).
Srinivasan et al., "HD Photo: a new image coding technology for digital photography," *Proceedings of SPIE*, vol. 6696, pp. 66960A-66960A-19, Jan. 1, 2007.
Tanaka et al., "A Rotation Method for Raster Image Using Skew Transformation," *Proc IEEE Conf on Computer Vision and Pattern Recognition*, pp. 272-277, Jun. 1986.
Tran et al., "Lapped Transform Based Video Coding," *Proc. SPIE Applicat. Digital Image Processing XXIV*, San Diego, CA, pp. 319-333 (Aug. 2001).
Tran, "Lapped Transform via Time-Domain Pre- and Post-Processing," *2001 Conference on Information Sciences and Systems*, The Johns Hopkins University (Mar. 21-23, 2001), 6 pp.
Tran et al., "Lapped Transform via Time-Domain Pre- and Post-Filtering," *IEEE Transactions on Signal Processing*, vol. 51, No. 6, pp. 1557-1571 (Jun. 2003).
Tran et al., "Regularity-constrained pre- and post-filtering for block DCT-based systems," *IEEE Trans. on Signal Processing*, vol. 51, No. 10, pp. 2568-2581 (Oct. 2003).
Tu et al., "Context-Based Entropy Coding of Block Transform Coefficients for Image Processing," *IEEE Transactions on Image Processing*, vol. 11, No. 11, pp. 1271-1283 (Nov. 2002).
Wang et al., "Interlace Coding Tools for H.26L Video Coding," ITU, VCEG-O37, 20 pp. (Nov. 2001).
Wien, "Variable Block-Size Transforms for H.264/AVC," *IEEE Trans. on Circuits and Systems for Video Technology*, vol. 13, No. 7, pp. 604-613 (Jul. 2003).
Wien, "Variable Block-Size Transforms for Hybrid Video Coding," Dissertation, 182 pp. (Feb. 2004).
Ahmed et al., "Discrete Cosine Transform," *IEEE Transactions on Computers*, pp. 90-93, Jan. 1974.
Daubechies et al., "Factoring Wavelet Transforms Into Lifting Steps," 26 pages, Sep. 1996 (revised Nov. 1997).
HD Photo Bitstream Specification, Version 1, 74 pages, May 27, 2008.
HD Photo Device Porting Kit, Version 1.0, 4 pages, Nov. 2006.
HD Photo Device Porting Kit Specification, Version 1.0, 26 pages, May 27, 2008.
HD Photo Feature Specification, Version 1.0, 43 pages, May 27, 2008.
Srinivasan et al., "HD Photo: A new image coding technology for digital photography," *Proc. of SPIE*, vol. 6696, 19 pages, 2007.

\* cited by examiner

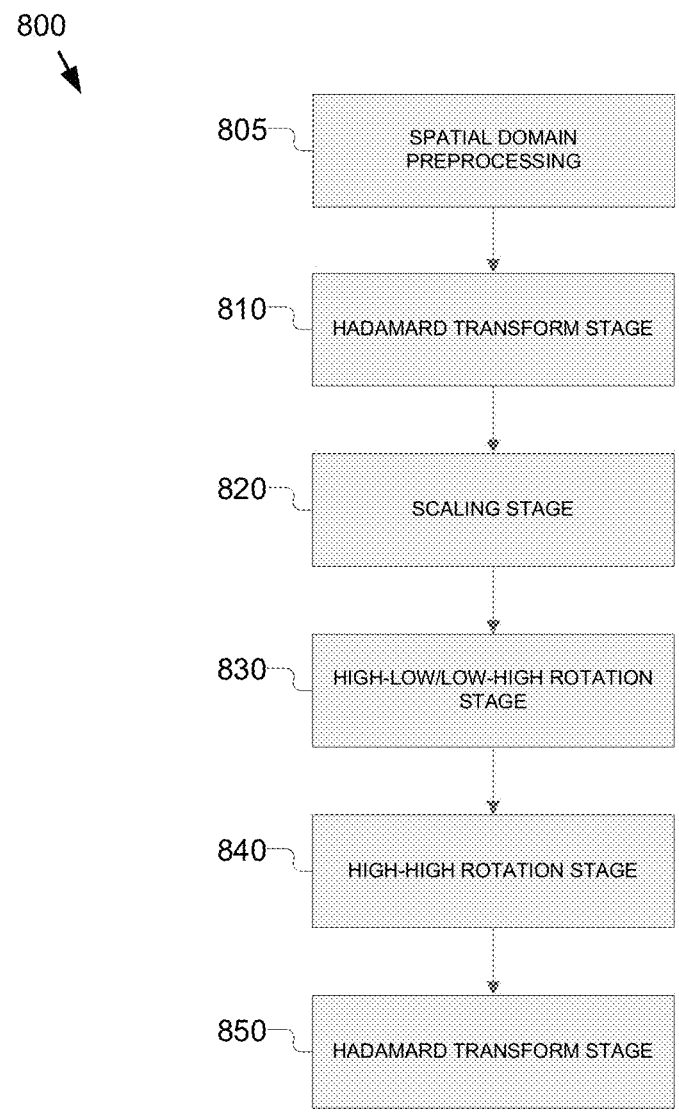

```
2100 if (leak_estimate1 > 0 && leak_estimate2 > 0)
        leak_estimate_new = Min(leak_estimate1, leak_estimate2)
else if (leak_estimate1 < 0 && leak_estimate2 < 0)
        leak_estimate_new = Max(leak_estimate1, leak_estimate2)
else
        leak_estimate_new = 0
```

```
if ((Abs(leak_estimate_new) <= hp_step_size/2 && hp_step_size > 20) ||
    bands_present == dc_only || bands_present == no_highpass) {
        leakage_compensation( )
} else {
    // No compensation
}
```

Software 2580 Implementing DC Leakage Mitigation Solutions

REDUCING DC LEAKAGE IN HD PHOTO TRANSFORM

CROSS REFERENCE TO RELATED APPLICATIONS

This application is a divisional of U.S. patent application Ser. No. 12/165,474, filed Jun. 30, 2008, which claims the benefit of U.S. Provisional Application No. 61/130,131, filed May 27, 2008, both of which are incorporated herein in its entirety.

FIELD

The invention relates generally to digital media (e.g., video and image) compression using transform coding.

BACKGROUND

Transform coding is a compression technique used in many audio, image and video compression systems. Uncompressed digital images and video are typically represented or captured as samples of picture elements or colors at locations in an image or video frame arranged in a two-dimensional (2D) grid. This is referred to as a spatial-domain representation of the image or video. For example, a typical format for a rectangular-shaped image consists of three two-dimensional arrays of 8-bit color samples. Each sample is a number representing the value of a color component at a spatial location in a grid, where each color component represents an amplitude along an axis within a color space, such as RGB, or YUV, among others. An individual sample in one of these arrays may be referred to as a pixel. (In other common usage, the term pixel is also often used to refer to an n-tuple of n color component samples that are spatially co-located—for example, to refer to a 3-tuple grouping of the R, G, and B color component values for a given spatial location—however, the term is used here to refer to a scalar-valued sample). Various image and video systems may use various different color, spatial and time resolutions of sampling. Similarly, digital audio is typically represented as time-sampled audio signal stream. For example, a typical audio format consists of a stream of 16-bit amplitude samples of an audio signal representing audio signal amplitudes at regularly-spaced time instants.

Uncompressed digital audio, image and video signals can consume considerable storage and transmission capacity. Transform coding can be used to reduce the quantity of data needed for representing such digital audio, images and video by transforming the spatial-domain (or time-domain) representation of the signal into a frequency-domain (or other like transform domain) representation, to enable a reduction in the quantity of data needed to represent the signal. The reduction in the quantity of data is typically accomplished by the application of a process known as quantization or by the selective discarding of certain frequency components of the transform-domain representation (or a combination of the two), followed by application of entropy encoding techniques such as adaptive Huffman encoding or adaptive arithmetic encoding. The quantization process may be applied selectively, based on the estimated degree of perceptual sensitivity of the individual frequency components or based on other criteria. Appropriate application of transform coding generally produces much less perceptible degradation of the digital signal as compared to reducing the color sample fidelity or spatial resolution of images or video directly in the spatial domain, or of audio in the time domain.

More specifically, a typical block transform-based coding technology divides the uncompressed pixels of the digital image into fixed-size two dimensional blocks $(X_1, \ldots X_n)$. A linear transform that performs spatial-frequency analysis is applied to the blocks, which converts the spatial-domain samples within the block to a set of frequency (or transform) coefficients generally representing the strength of the digital signal in corresponding frequency bands over the block interval. For compression, the transform coefficients may be quantized (i.e., reduced in precision, such as by dropping least significant bits of the coefficient values or otherwise mapping values in a higher precision number set to a lower precision), and also entropy or variable-length coded into a compressed data stream. At decoding, the transform coefficients will be inverse-quantized and inversely transformed back into the spatial domain to nearly reconstruct the original color/spatial sampled image/video signal (reconstructed blocks $\hat{X}_1, \ldots \hat{X}_n$).

The ability to exploit the correlation of samples in a block and thus maximize compression capability is a major requirement in transform design. In many block transform-based coding applications, the transform should be reversible to support both lossy and lossless compression, depending on the quantization operation applied in the transformed domain. With no quantization applied, for example, an encoding technology utilizing a reversible transform can enable the exact reproduction of the input data upon application of the corresponding decoding process. However, the requirement of reversibility in these applications constrains the choice of transforms upon which the coding technology can be designed. The implementation complexity of a transform is another important design constraint. Thus, transform designs are often chosen so that the application of the forward and inverse transforms involves only multiplications by small integers and other simple mathematical operations such as additions, subtractions, and shift operations, so that fast integer implementations with minimal dynamic range expansion can be obtained.

Many image and video compression systems, such as the JPEG (ITU-T T.81|ISO/IEC 10918-1) and MPEG-2 (ITU-T H.262|ISO/IEC 13818-2), among others, utilize transforms based on the Discrete Cosine Transform (DCT). The DCT is known to have favorable energy compaction properties. The DCT is described by N. Ahmed, T. Natarajan, and K. R. Rao, "Discrete Cosine Transform," *IEEE Transactions on Computers*, C-23 (January 1974), pp. 90-93.

When compressing a still image (or an intra coded frame in a video sequence), most common standards such as JPEG and MPEG-2 partition the arrays representing the image into 8×8 areas and apply a block transform to each such image area. The transform coefficients in a given partition (commonly known as a block) in these designs are influenced only by the sample values within the block region. In image and video coding, quantization of these independently-constructed blocks can result in discontinuities at block boundaries, and thus produce visually annoying artifacts known as blocking artifacts or blocking effects. Similarly for audio data, when non-overlapping blocks are independently transform coded, quantization errors will produce discontinuities in the signal at the block boundaries upon reconstruction of the audio signal at the decoder. For audio, a periodic clicking effect may be heard.

Techniques that are used to mitigate the blocking artifacts include using deblocking filters to smooth the signal values across inter-block edge boundaries, and using spatial extrapolation to encode differences between the raw input data and a prediction from neighboring block edges. These techniques are not without their flaws. For instance, the deblocking filter approach is "open loop," i.e., the forward transform process does not ordinarily take into account the fact that deblocking is going to be performed after the inverse transform by the decoder. Also, both these techniques require significant computational implementation resources.

Another approach to reduce blocking effects is by using a lapped transform as described in H. Malvar, "Signal Processing with Lapped Transforms," Artech House, Norwood Mass., 1992. A lapped transform is a transform having an input region that spans, besides the data samples in the current block, some adjacent samples in neighboring blocks. Likewise, on the reconstruction side, the inverse lapped transform influences some decoded data samples in neighboring blocks as well as data samples of the current block. Thus, the inverse transform can preserve continuity across block boundaries even in the presence of quantization, consequently leading to a reduction of blocking effects. Another advantage of a lapped transform is that it can exploit cross-block correlation, which yields greater compression capability.

For the case of 2-dimensional (2D) data, the lapped 2D transform is a function of the current block, together with select elements of blocks to the left, above, right, below and possibly of the above-left, above-right, below-left and below-right blocks. The number of data samples in neighboring blocks that are used to compute the current transform is referred to as the amount of overlap.

For picture (image) compression, one of the best-performing transforms in terms of rate-distortion performance is the lapped biorthogonal transform (LBT). See, H. S. Malvar, "Biorthogonal And Nonuniform Lapped Transforms For Transform Coding With Reduced Blocking And Ringing Artifacts," *IEEE Trans. on Signal Processing*, vol. 46, pp. 1043-1053, April 1998.

SUMMARY

In the absence of fidelity loss due to quantization or other distortion of transform coefficient values, a reversible transform is one that is designed so that the forward transform performed at the encoder and the inverse transform performed at the decoder produce lossless reconstruction of the original input data.

The operation of the forward transform produces a block of coefficients. One of these coefficients typically has the lowest associated frequency characteristics of the set of such coefficients, and this coefficient is thus typically referred to as the DC coefficient. It typically represents, or is substantially correlated with, the mean of all the values in the input data. The other transform coefficients are termed AC coefficients. When transforming data such as images, which have a high degree of inter-sample correlation in the spatial domain, the DC coefficient will often represent most of the signal energy, and the AC coefficients will often have relatively small values—allowing the AC coefficients to be quantized to zero or to other small values that require few bits for encoding. (The terms "DC" and "AC" that are commonly used in the art in this context are somewhat analogous to their ordinary meaning in the context of electrical power, although they do not strictly have the same meaning.)

If the transform is designed appropriately, the result of the operation of the forward transform on a set of input data that all have the same value (i.e. a perfectly flat input signal) will be represented only by the DC coefficient. All AC coefficients produced by operating the transform on such a set of input data will be exactly equal to zero. However, if the transform is designed to meet other constraints, such as transform reversibility or low computational resource requirements, the transform may produce some AC coefficients that are not equal to zero under such circumstances. This phenomenon is called DC leakage. The DC value "leaks" into one or more of the surrounding AC coefficients.

From the decoder perspective, the encoder's use of a forward transform that induces DC leakage will typically correspond to using an inverse transform in a decoder that requires some AC coefficients to not be equal to zero in order for the operation of the inverse transform to result in a perfectly flat reconstructed signal that accurately reproduces a flat signal that was the input to the forward transform.

Note that DC leakage can have effects at the encoder, or decoder or both. If the transform is reversible, the decoder-side DC leakage effect is the exact inverse of the encoder side DC leakage effect. Thus, in the absence of quantization, the DC leakage effect would cancel out between the encoder and decoder.

DC leakage can cause two related problems. DC leakage in the forward transform at the encoder can result in non-zero AC coefficients even when the input data to the forward transform all have identical values, while a transform without DC leakage would have produced only a single non-zero DC coefficient for the same set of input data. When the quantization step size is small, these AC coefficients will not be quantized to zero. These AC coefficients can require extra bits to represent in the entropy coding stage, and can thus decrease compression performance at medium to high bit rates, e.g., when the quantization step size is small.

DC leakage in the inverse transform at the decoder can cause artifacts at low bit rates, e.g., when the quantization step size is large. Under such circumstances, the AC coefficient values may be quantized to zero, whereas having a non-zero value for these coefficients is required to produce a flat inverse-transformed result from the decoding process. When the step size is large, the AC coefficients produced at the encoder are likely to be quantized to zero, with the effect that the non-zero AC coefficient values that are required to correctly reconstruct a flat signal are no longer indicated to be non-zero in the encoded data. Thus, only the DC coefficient forms the input to the inverse transform. In the absence of DC leakage, the inverse transformed output would have been a perfectly flat reconstructed signal. However, in the presence of DC leakage, due to the missing AC coefficient values that are otherwise required to reconstruct the DC value, the output produced will not be flat, and can have checker-board type artifacts.

Multiple approaches are taken to resolve this problem of DC leakage.

In one embodiment, the forward transform and inverse transform are redesigned so as to eliminate or mitigate leakage. In particular, this redesign may include redesigning or removing a scaling stage from a photo overlap transform to remove or mitigate the amount of DC leakage. This redesign, in some instances, can preserve some level of compatibility with the existing transform.

In other embodiments, processing is performed at the decoder to mitigate the effect of the DC leakage of the inverse transform. In some cases, certain pixel values in the spatial domain are modified by an estimation of the amount of DC leakage. In other cases, certain coefficients in the frequency domain are adjusted by an estimation of the DC leakage. In yet other cases, this processing is performed partly in the spatial domain and partly in the frequency domain. In certain instances the amount of DC leakage is estimated using, e.g., one or more of the quantization step size, the quantized coefficient values, and other information available at the decoder. This processing, in some instances, does not require modification of the encoder.

In other embodiments, processing is performed at the encoder to mitigate the effect of encoder side DC leakage. In some embodiments, this operation can be performed as pre-processing in the spatial domain prior to performing the forward transform by modifying certain pixel values by an estimate of the DC leakage. In other embodiments, certain coefficients in the transform domain are modified by an estimate of the DC leakage. This processing is performed, in some instances, in combination with decoder side processing. Such encoder-side processing may be signaled in the bit stream, and this indication signal is then read by the decoder, which can use this information to control its processing. The encoder-side processing, in other instances, does not require modification to the decoder.

The above summary is just a brief overview and is not meant to describe all features. The foregoing and other objects, features, and advantages of the invention will become more apparent from the following detailed description, which proceeds with reference to the accompanying figures.

BRIEF DESCRIPTION OF THE DRAWINGS

FIG. 8 is a block diagram of a photo overlap transform.

DETAILED DESCRIPTION

The following description relates to a digital media compression system or encoder or decoder which utilizes a lapped transform with DC leakage reduction. For purposes of illustration, an embodiment of a compression system incorporating this lapped transform with reduced DC leakage effects is an image or video compression system. Alternatively, the DC leakage reduction also can be incorporated into compression systems or encoders or decoders for other 2D data. The DC mitigation techniques do not require that the digital media compression system encodes the compressed digital media data in a particular coding format.

1. Encoder/Decoder

Figure 1:
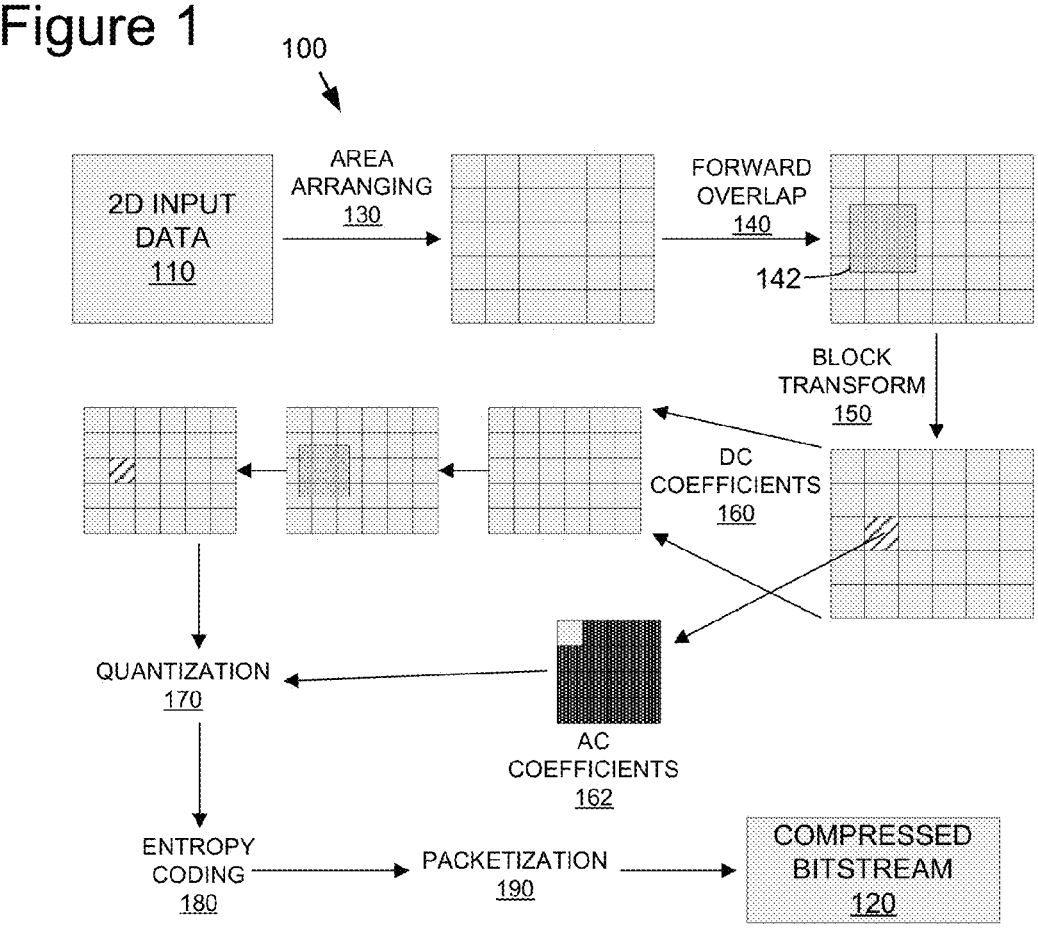
FIG. 1 is a flow diagram of an encoder based on a lapped transform utilizing a reversible overlap operator.
Figure 2:
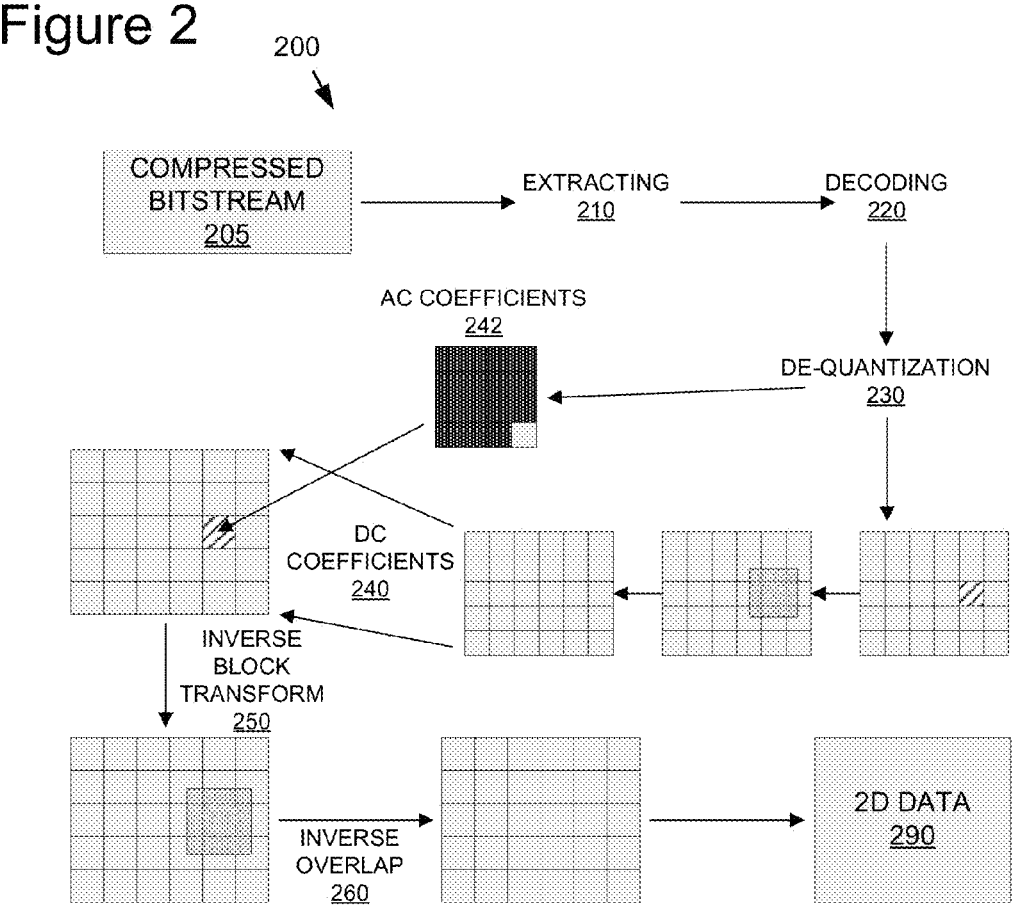
FIG. 2 is a flow diagram of a decoder based on the lapped transform.
Figure 3:
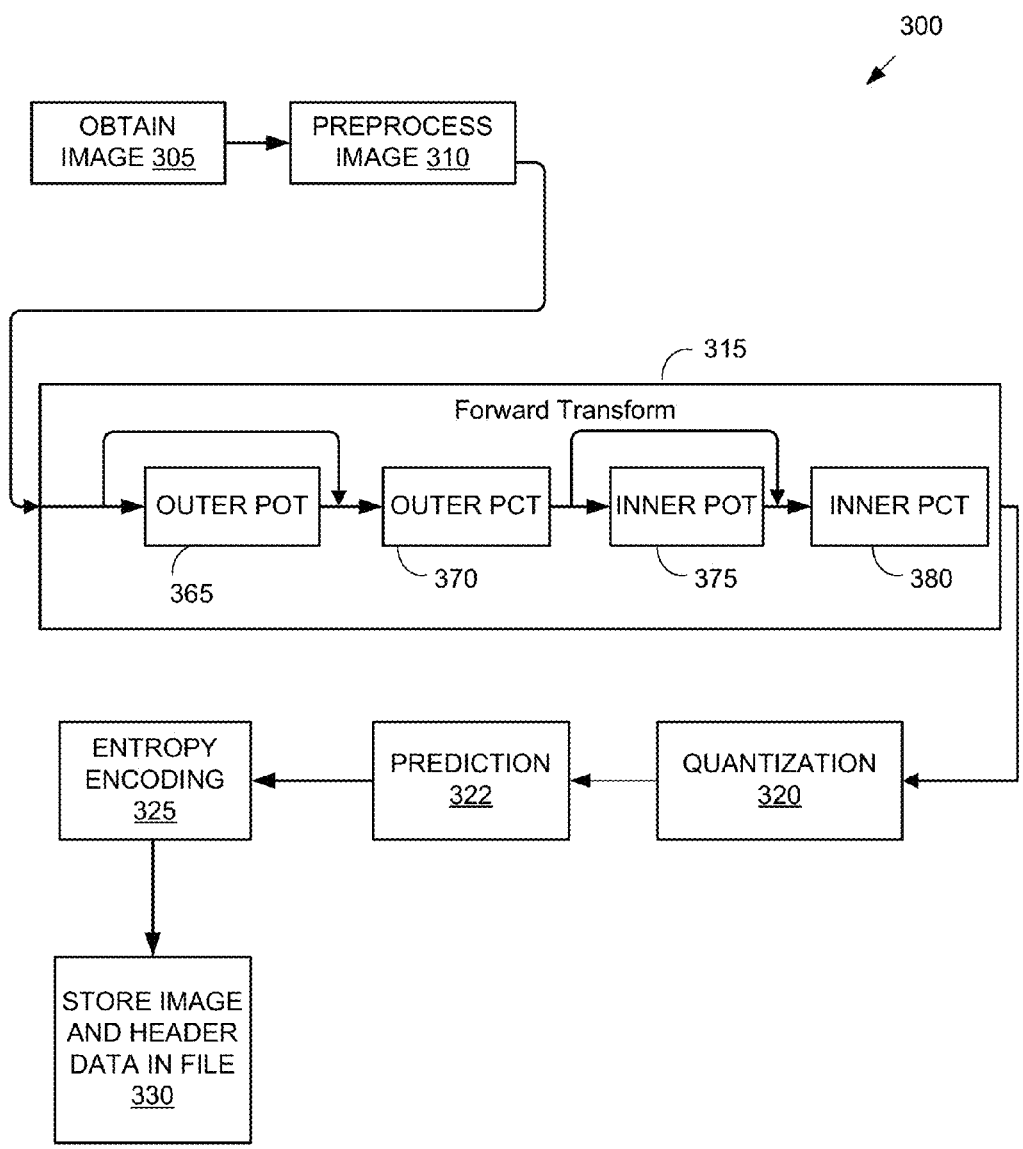
FIG. 3 is a block diagram of an encoder that can be used to implement DC leakage amelioration or elimination.
Figure 4:
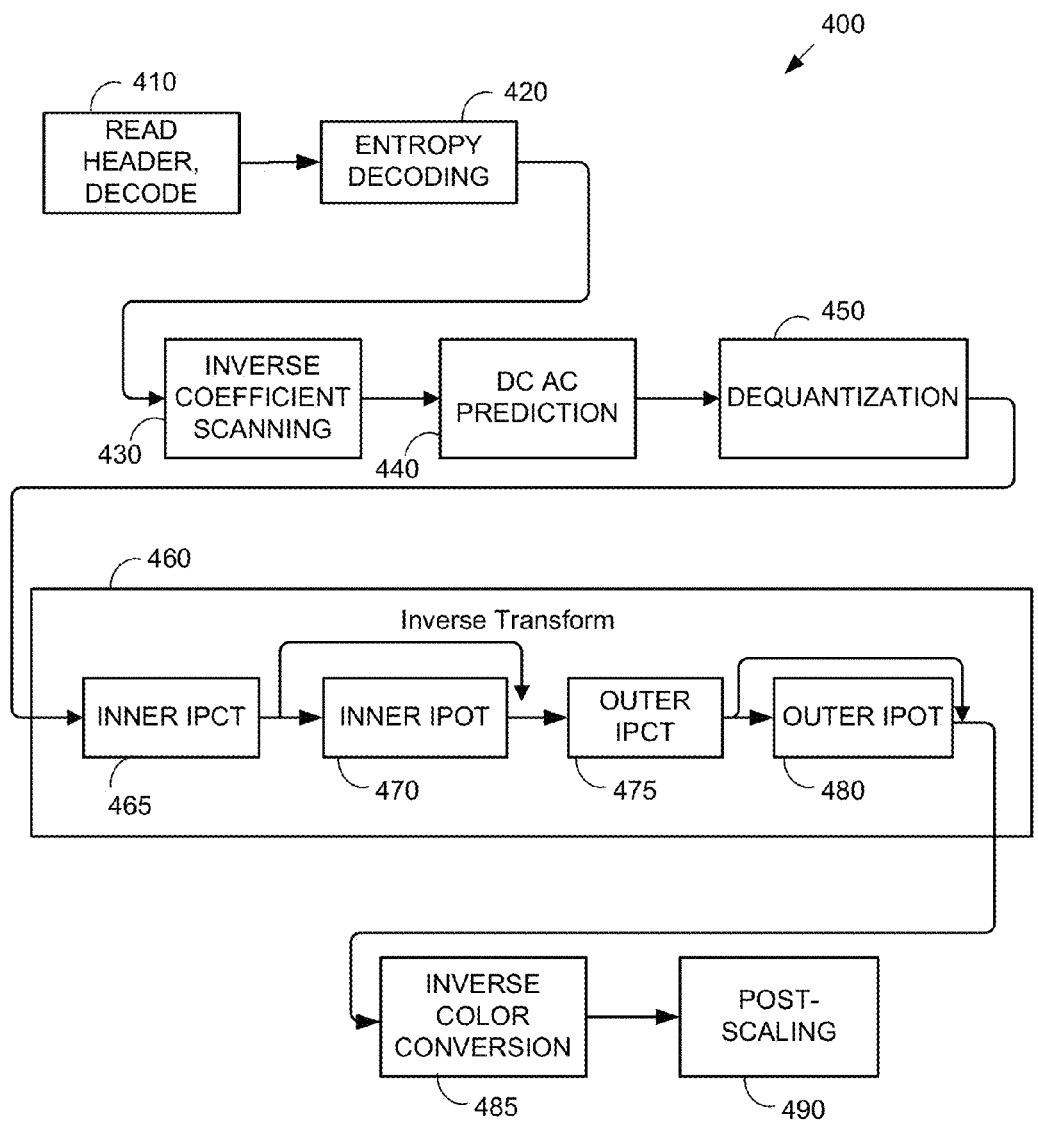
FIG. 4 is a block diagram of a decoder that can be used to implement DC leakage amelioration or elimination.

A representative but generalized and simplified data encoder and decoder comprise the following:

FIGS. 1 and 2 are a generalized diagram of the processes employed in a representative 2-dimensional (2D) data encoder 100 and decoder 200 based on a lapped transform using techniques to reduce DC leakage effects. FIGS. 3 and 4 are generalized diagrams of the same or a similar decoder at a different level of abstraction. The diagrams present a generalized or simplified illustration of the use and application of this reversible overlap operator in a compression system incorporating the 2D data encoder and decoder. In alternative encoders based on these DC leakage mitigation techniques, additional or fewer processes than those illustrated in this representative encoder and decoder can be used for the 2D data compression. For example, some encoders/decoders may also include color conversion, any variety of color formats, scalable coding, lossless coding, macroblock modes, etc. The described compression system (encoder and decoder) can provide lossless and/or lossy compression of the 2D data, depending on the application of quantization which may be based on one or more quantization control parameters controlling the degree of fidelity loss in the encoded representation over a wide range of selectable fidelities ranging from perfectly lossless all the way to very coarse (high compression ratio) representations.

The 2D data encoder 100, 300 produces a compressed bitstream 120 that is a more compact representation (for typical input) of 2D data 110 presented as input to the encoder. The forward overlap operator (shown as shaded block 142) is, in an exemplary embodiment, four photo overlap transform operators. For example, the 2D data input can be an image, a frame of a video sequence, or other data having two dimensions, referred to, generally, as an image.

With reference to FIG. 2, as a brief overview, the decoder 200 performs the reverse process. On the decoder side, the transform coefficient bits are extracted 210 from their respective packets in the compressed bitstream 205, from which the coefficients are themselves decoded 220 and dequantized 230. The DC coefficients 240 are regenerated by applying an inverse transform, and the plane of DC coefficients is "inverse overlapped" using a suitable smoothing operator applied across the DC block edges. Subsequently, the entire data is regenerated by applying the 4×4 inverse transform 250 to the DC coefficients, and the AC coefficients 242 decoded from the bitstream. Finally, the block edges in the resulting image planes are inverse overlap filtered 260. This produces a reconstructed 2D data output.

With reference to FIG. 3, an image 305 is obtained as a set of two-dimensional arrays (also known as color channels) of sample values, each entry of which represents the intensity of a color component such as a measure of red, green, or blue light component intensity (RGB), or as a measure of luma brightness and chroma color deviations from neutral grayscale color toward blue or red (YUV).

A. Color Conversion

In a color converter (not pictured), the source image may be color converted. This conversion may be from an RGB color space to a luma-chroma space or to a different color space or subspace. Internally, an exemplary image can be converted from RGB color space or some other color space into any variety of single or multiple color channels. The first channel is typically called the luma channel or plane, and the remaining channels are called the chroma channels or planes. The luma channel typically roughly corresponds to a monochrome representation of the image. A monochrome image has only a luma plane. A YUV image has a luma plane and two chroma planes. An exemplary photographic image can also have a special color channel, referred to as the alpha channel, which controls the transparency of the image. Alpha channel support is very important to many applications such as gaming, graphical content representation, and animation. Some implementations may support up to 16 or more color channels and an alpha channel.

In an exemplary implementation, supported color formats include monochrome, RGB, CMYK, and N-Channel; supported data types include signed integer, unsigned integer, fixed-point float and floating-point float; and supported bit depths include 8, 16, 24 and 32 bits per color channel. Exemplary embodiments can support most of the practically important combinations of color formats, data types and bit depths. They also allow for lossless compression of images that use up to 24 bits per color channel, and lossy compression of images that use up to 32 bits per color channel. Several other useful formats are also supported: binary black-and-white, RGB555, RGB565, and RGB 101010. Support may also be provided for rich metadata, using EXIF and XMP.

B. Preprocessing

At 310, the image may be preprocessed to reduce noisiness in the data, to reduce the resolution of the picture prior to encoding, etc.

These color channels can then undergo subsampling (also called downsampling and typically accompanied by anti-alias low-pass filtering). Initially, the color channels may have the same spatial resolution. However, in certain formats, the luma channel is stored with more detail than the color (chroma) planes. For example, if the color format is YUV 4:2:2, the two chroma channels have half of the resolution of the luma channel horizontally. If the color format is YUV 4:2:0, the two chroma channels have half of the resolution of the luma channel both horizontally and vertically.

Figure 5:
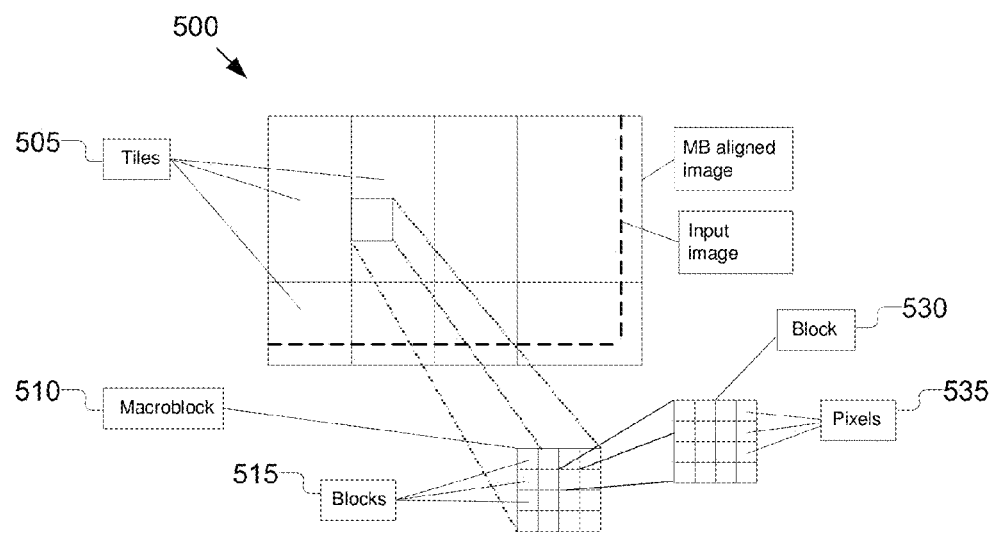
FIG. 5 is a diagram of a possible spatial hierarchy in an image.

As shown with reference to FIG. 5, the spatial hierarchy in an exemplary image is defined, from smallest to largest entity as follows:

1. Pixel (sample) 535
2. Block 530
3. Macroblock 510
4. Tile 505
5. Image 500

In an exemplary implementation, a block 530 is a 2-dimensional 4×4 array of adjacent pixels (samples) 535 corresponding to a single color channel. A macroblock 510 is a 2-dimensional grouping of adjacent 4×4 blocks, including spatially co-located blocks from the luma and chroma channels. Each color channel contributes a group of blocks to a macroblock 510 such that a macroblock 510 corresponds to a 16×16 region in the luma array (i.e. a macroblock contains a 4×4 group of 4×4 blocks for the luma channel and a 4×2 group of 4×4 blocks for each of two YUV 4:2:2 chroma channels or a 2×2 group of 4×4 blocks for each of two YUV 4:2:0 chroma channels.) Other color channel macroblock types and sizes are also envisioned.

In an exemplary implementation, a tile 505 is a 2-dimensional group of adjacent macroblocks 510. Tiles 505 may form a regular pattern on the image—in other words, in such a case, tiles 505 in a horizontal row are of the same height and aligned; tiles 505 in a vertical column are of the same width and aligned. An image 500 may contain between 1 and 4096 columns of tiles 505 in the horizontal direction and between 1 and 4096 rows of tiles 505 in the vertical direction. The transform coefficients for each tile 505 may be coded independently of the coefficients present for the other tiles 505. Thus, each tile 505 can be entropy decoded independently.

C. Forward Transform

At 315, a two-dimensional spatial transform process is applied to the pixels in the (possibly overlapping) blocks (as shown with reference to FIGS. 1 and 2) of the image data 500 (considered to be in the spatial domain) to obtain blocks of transform coefficients (considered to be in a frequency domain). These frequency-domain coefficients are also called spectral coefficients. This stage is sometimes called the "forward transform stage" to distinguish it from the "inverse transform stage" that is applied in a corresponding decoding process.

In an exemplary implementation, the blocks (of a color channel) are transformed from the spatial (pixel) domain into the frequency domain using an integer transform. This transform may be hierarchical, lapped, and reversible. When the integer transform is reversible, the algorithm can provide both bit-exact and lossless compression. The transform may be based on two operations, the core transform and the overlap operator, described in more detail below.

The transform may have two hierarchical stages, as follows:

1. First Stage

Figure 6:
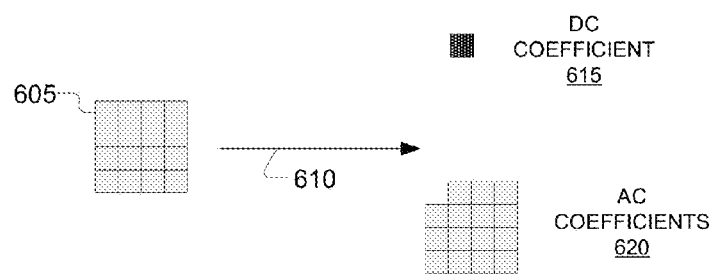
FIG. 6 is a flow diagram of a first-stage transform on a block.
Figure 7:
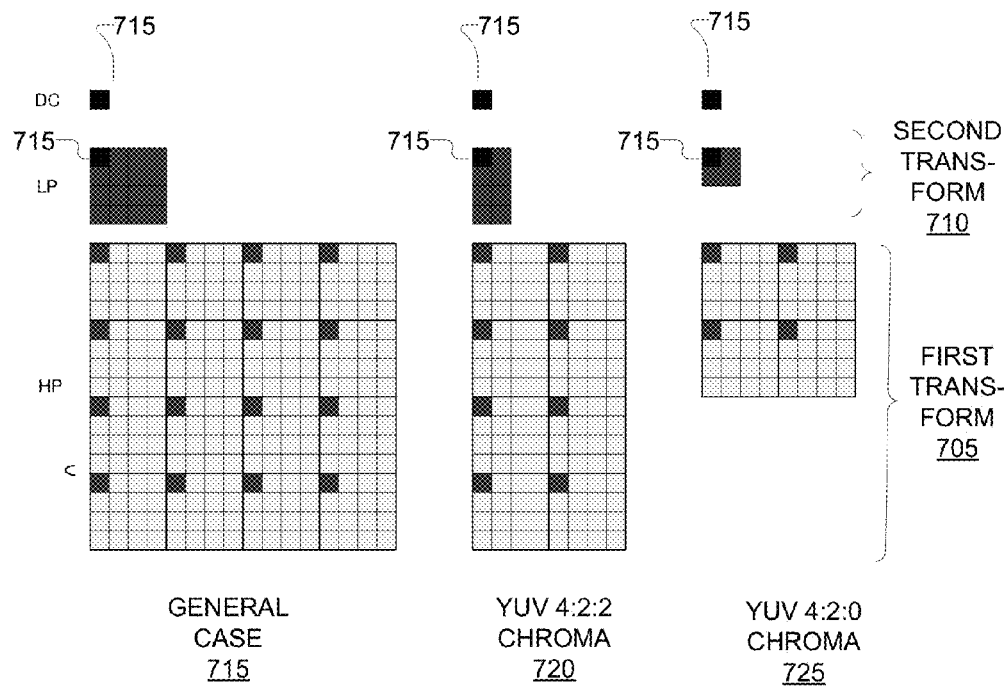
FIG. 7 is a diagram of a frequency hierarchy of different macroblock types.

With reference to FIG. 6, in the first stage, each block 605 (which may be 4×4 blocks) within a macroblock 510 undergoes a first stage transform 610, yielding one DC coefficient 615, with the rest (e.g., 15) of the coefficients being AC coefficients 620. The initial transform stage 610 consists of an optional outer photo overlap transform (POT) 365, and an outer photo core transform (PCT) 370. This is further illustrated in FIG. 7, where the resulting macroblocks after the first transform 705 are shown. The DC Coefficients are shown in black, with the AC coefficients shown in gray.

2. Second Stage

The resulting DC coefficients are then further collected into a single block (of size 4×4, 4×2, or 2×2, depending on the size of the original macroblock), and a second transform stage is applied to this block. The second stage transform consists of an optional inner photo overlap transform (POT) 375 (FIG. 3) and an inner photo core transform (PCT) 380 (FIG. 3). This yields 16, 8, or 4 new coefficients 710, composed of a second stage DC coefficient (e.g., 715), and the 15, 7, or 3 second stage AC components. The DC coefficient 715 is referred to the DC coefficient of the original macroblock. The AC coefficients are referred to as the lowpass (LP) coefficients of the original macroblock.

The other (240, 120, or 60) coefficients, i.e., the AC coefficients of the first stage transform 705 of the macroblock, are referred to as the highpass (HP) coefficients. For example, the YUV 4:2:2 and YUV 4:2:0 chroma planes of each macroblock have 120 and 60 highpass coefficients, respectively.

The transform coefficients are grouped into three subbands according to this classification: the DC band, the lowpass (or LP) band, and the highpass (or HP) band. These bands correspond to 1:16, 1:4 and 1:1 subsampled resolutions of the picture, in terms of luma resolution. The DC, LP and HP bands may be quantized and coded independently of each other. As described below, the HP band may be partitioned into two components and coded.

The LP band of a macroblock is composed of the AC coefficients (15 coefficients for the general case, 7 for YUV 4:2:2 and 3 for YUV 4:2:0 chroma channels) of the second (inner) stage transform.

The coefficients in the transform bands may be coded independently, and thus, the bitstream may contain three levels of spatial resolution.

The Photo Overlap Transform (POT) operator 370, 380 (FIG. 3) is functionally independent from the core transform, and can be switched on or off by the encoder. In a specific implementation, three possible switching modes are allowed:

a) Overlap Mode 0: POT is turned off for both the inner and outer stages.
b) Overlap Mode 1: POT is turned off for the inner stage, and turned on for the outer stage.
c) Overlap Mode 2: POT is turned on for both the inner and outer stages.

The choice of overlap mode is signaled in the compressed bitstream, and the decoder uses this information to switch on/off the inverse POT operator in its inverse transform operations corresponding to the inner and outer stages.

The two-stage hierarchical nature of the transform process has the compression benefits of a transform that is larger than 4×4 in size, while reducing ringing and blocking artifacts as compared to traditional 8×8 transforms. Another benefit of the transform is its small dynamic range expansion and low computational complexity. Further, the transform operations are amenable to parallelized implementation using SIMD (Single Instruction, Multiple Data) instructions.

D. Quantizer Flexibility and Signaling

In certain implementations, a quantization process 320 is applied to reduce the entropy of the transform coefficients. If this quantization stage 320 is eliminated and the transform stage introduces no error, the image representation can be lossless; otherwise some loss of fidelity is necessary and is inherent in any application of a quantization process. In some cases, the quantization process is (partly or entirely) controlled by one or more quantization control parameters that are encoded by the encoder along with the other data representing the encoded image.

The sensitivity of the human visual system to distortion varies spatially based on the local statistics of the image. Further, the perceived distortion varies with the frequency of the transform coefficient, such that a given amount of distortion in a high frequency band may be less perceptible than the same amount of distortion in a lower frequency band. The visual sensitivity also depends on the nature of the color channel, e.g., whether the color channel is luma or chroma.

One or more quantization step size control parameters are used to determine the step size of the transform coefficient quantization process for each transform coefficient. The selection of a quantization step size value that is appropriate to the visual importance of a given coefficient can provide a visually superior compression. In a design in which the application of a reversible forward transform produces integer-valued transform coefficient values, the use of a quantization step size equal to 1 (or smaller than 1) is ordinarily equivalent to bypassing the quantization operation entirely, thus enabling a lossless representation of the original sample values. An equivalent ability to perform lossless encoding may occur for other reversible transform designs when the quantization step size is relatively small or when the quantization process is bypassed by some means other than specification of a quantization step size.

The quantization step size can be varied based on the location of the coefficient to be quantized within the image, based on the frequency band or the color channel to which the coefficient belongs, and so forth. The quantization step size can be varied over a wide range to enable a broad range of control over the trade-off between the encoded bit rate and the fidelity of the image representation and can allow selection of a sufficiently small quantization step size to support a perfectly lossless representation.

In some embodiments, the quantizer applies uniform step size mid-tread scalar quantization to the data using the chosen step size. Each transform coefficient value in the frequency-transformed block is divided by a value in a quantization step size table (the quantization step size value being determined by the frequency of the transform coefficient and one or more quantization step size control parameters, as necessary), and the result is rounded to an integer quantization index value by adding a signed offset and truncating any non-integer remainder toward zero, as further described below.

Step sizes can be shared across color planes, tiles and/or frequency bands. Step sizes can be controlled by quantization control parameters specified at the image level, the tile level, the macroblock level, the block level, etc., and may depend on the frequency band of the coefficient to be quantized.

In the spatial dimension, the following flexibility may exist:

1. The entire image can be coded using the same quantization step size.
2. An entire tile can be coded using the same quantization step size which is signaled in the tile header, and different tiles within the image can use different quantization step sizes.
3. Different macroblocks within the tile can use different quantization step size values.

In some implementations, the tile header can define up to 16 sets of quantization control parameter values. In such a case, for macroblocks, the control parameter values specifying the quantization step sizes to be applied are then selected by information sent as part of the macroblock information for each individual macroblock. In an exemplary implementation, only the quantization step sizes for the lowpass and highpass bands can vary on a macroblock basis. In some implementations, a single value of quantization step size is used for all of the DC coefficients of all macroblocks in the tile. The control parameters specifying the quantization step sizes to be applied may be variable length coded to further reduce the signaling overhead.

The following flexibility may be allowed in varying the quantization processing across different frequency bands:

1. All the frequency bands can use the same quantization step size.
2. The coefficients in the DC and lowpass bands can use the same quantization step size, while the coefficients in the highpass band can use a different quantization step size.
3. The coefficients in the lowpass and highpass bands can use the same quantization step size, while the DC coefficients use a different quantization step size.
4. Each frequency band can use a different quantization step size.

The relationship between the quantization step size of the different color channels may be specified in the following modes.

1. In the uniform mode, the quantization step size for all the color channels is identical.
2. In the mixed mode, the quantization step size for the luma color channel is set to one value, while the quantization step size for all other color channels is set to a different value.
3. In the independent mode, the quantization step size for each color channel can be specified separately.

Combinations of these flexibilities may also be allowed. For example, one tile could have independent quantization step sizes for the different color channels, but the same quantization step size for the different frequency bands within each of these color channels. Another tile could have different quantization step sizes for the different frequency bands, but use the same band-specific quantization step size for all color channels.

In an alternative embodiment, the dependencies of the quantization scheme on the frequency band in which each transform coefficient belongs could be replaced with dependencies on other classifications of coefficients, such as a dependency on the specific 2-dimensional (horizontal and vertical) frequency index of each coefficient.

Thus, this flexible quantization scheme can be tuned to optimize coding performance as well as to support features such as region of interest (ROI) decoding. At the same time, the overhead in terms of the number of bits needed to signal the quantization step sizes for the most common application scenarios is very small.

E. Prediction

In an exemplary implementation, some coefficients can be predicted 322 from the corresponding coefficients of neighboring blocks or macroblocks. For example, the DC coefficients can, sometimes, be predicted from the DC coefficients of the left neighboring macroblock, or from the DC coefficient of the top neighboring macroblock or both. In some implementations, the DC prediction direction is computed from the values of the DC coefficients of the neighboring macroblocks. In some cases, some of the lowpass coefficients of a macroblock can be predicted from the corresponding coefficients of the top or left neighbor macroblocks. In some implementations, the lowpass prediction direction may be computed from the DC prediction direction. In some implementations, this prediction may be performed only if the quantization step size of the current block and the neighbor block(s) used to form the prediction are equal. In some cases, some of the highpass coefficients of a block can be predicted from the corresponding coefficients of the top or left neighboring block in the same macroblock. In some implementations, the highpass prediction direction may be computed from the values of the lowpass coefficients. The (exact or approximate) difference between value of a coefficient and the value of its prediction is called the prediction error or residual signal. A coefficient that is not predicted can be considered to have a predicted value of 0.

F. Coefficient Scan and Entropy Coding

After quantization and prediction, the residual coefficients are coefficient scanned. Coefficient scanning (also called zigzag scanning) is the process of converting the 2-D array of transform coefficients within a block into a linear 1-D encodable list. Adjacent elements of the scan pattern are not required to be vertically or horizontally contiguous in the 2-D block. Generally, the higher frequency components tend to be grouped together at the end of the linear sequence while lower frequency components tend appear earlier in the linear sequence. In some implementations, the scan patterns can be adapted dynamically based on the local statistics of coded coefficients such that coefficients with higher probability of non-zero values are placed earlier in the scanning order. In some implementations, the adaptation may be performed based on the values of previously scanned coefficients.

In some implementations, three scan patterns are used: "lowpass," "highpass horizontal" and "highpass vertical." The lowpass scan pattern is used for the lowpass transform coefficients in a macroblock. The highpass horizontal and highpass vertical scan patterns are used for the highpass transform coefficients in a macroblock.

If horizontal HP prediction is chosen for the macroblock, it uses the highpass horizontal scan pattern. If vertical HP prediction is chosen for the macroblock, it uses the highpass vertical scan pattern. Macroblocks with no HP prediction also use the highpass horizontal scan pattern.

After scanning, the coefficients are entropy coded 325 to convert the resulting quantized transform coefficients to a more compact representation. The high frequency coefficients may be partitioned into two components—the "significant information" and the remainder. These two components may be treated differently. For example, the significant information may be entropy coded using variable length codes while the remainder may be signaled using fixed length codes. The partitioning of the two components may be determined by an adaptive coefficient normalization process which separates the more compressible and less compressible (or noisy) components, thereby providing computational and memory complexity advantages relative to the application of entropy coding to all components, while also providing bitrate scalability by allowing the remainder data to be separated into a distinct grouping of data that can be discarded to reduce the quantity of data used to represent the image.

With reference to FIG. 2, on the decoder side, the encoded transform coefficient bits are extracted 210 from their respective packets, from which the quantized coefficient indexes are decoded 220 and inverse quantized (dequantized) 230 and added to predicted values as applicable. The DC coefficients 240 of the next inverse transform stage are reconstructed by applying an inverse transform, and when overlapping has been applied, the array of DC coefficients is "inverse overlapped" using a suitable operator applied across the DC block edges. Subsequently, the next stage of inverse transformation is performed by applying the 4×4 inverse transform 250 to the DC coefficients, and its associated AC coefficients 242 that have been decoded from the bitstream. When overlapping has been applied, the block edges in the resulting image planes are inverse overlap filtered 260. Finally, the image is color converted to RGB when color conversion to that domain is needed for the final image. This produces a reconstructed 2D data output 290.

G. Exemplary Decoder

FIG. 4 describes another decoder, which may be the decoder of FIG. 2 at a different level of detail. At 410, the header information is read, and the decoding process is initializing accordingly. At 420, an entropy decoding process is performed to obtain the quantized transform coefficient values. At 430, the linear 1-D array is inverse coefficient scanned, converting the linear array into a 2-D block. At 440, in some implementations, optional DC, LP and HP prediction is performed. This predicts first "row" or "column" of transform block coefficients from neighboring blocks that have a causal relationship in the decoding process. At 450, an approximate inversion of the quantization process is performed. This stage may be called an "inverse quantization," "dequantization," or "transform coefficient reconstruction." At 460, 2-dimensional inverse transform processing is performed to convert the transform coefficients back to spatial-domain arrays of samples. The transform itself may occur in several stages, some of which are optional (i.e., applied or not applied, as determined by the encoder and indicated in the header data of the encoded image.) At 465, an inner Inverse Photo Core Transform (IPCT) is performed. At 470, an optional inner Inverse Photo Overlap Transform (IPOT) may be performed. At 475, an outer IPCT is performed. At 480, an optional outer IPOT may be performed. The decision of whether to perform the optional inner and outer IPOT operations may be based on overlap mode information that is signaled in the bitstream.

At 485, inverse color conversion is performed. This transforms the current color space (YCoCg, YUV, etc.), into a different color space, such as RGB. At 490, the image is then post-scaled.

As is well known in the art, in some ways this characterization of the encoding and decoding processing into these stages may be somewhat of an oversimplification, as the stages of the processing may be somewhat coupled together to simplify the computing resource requirements or to increase the performance of the encoding system in terms of the number of bits required to represent the picture with a certain level of fidelity or the speed of the encoding or decoding processes. For example, the quantization stage may be designed to account for the effect of the entropy encoding stage, or the operations of different stages may be interleaved with each other to minimize the need for storing the results of one stage prior to operation of the next stage of processing.

H. Quantization and Inverse Quantization

In referring to the quantization process stage in particular, many various types of processing can be performed. As a rigorous mathematical definition, quantization refers to performing some type of functional mapping process in which multiple possible input values (or some range or ranges of possible input values) will be mapped to the same output values, thereby reducing the entropy of the data in the information-theoretic sense. The precise form of operation of that mapping process can, in general, depend on many different factors. Similarly, the actual operation of the inverse quantization (dequantization) process applied in a decoder can, in general, depend on many different factors.

It is typical in the art for the quantization and inverse quantization processes to depend on a parameter known as the quantization step size. The quantization step size controls the fidelity achieved through the quantization and inverse quantization stages of the processing, and the quantization step size that is applied during the quantization of each transform coefficient is ordinarily indicated by some form of quantization control parameters in the header data of the encoded information so that the value of the step size parameter is available for use by the decoding process.

Often the quantization and inverse quantization processes are operated or modeled as a simple mid-tread (or dead-zone based) scalar quantizer employing a single quantization step size. In such a simplified model, the operation of the quantization process in the encoder is performed using some exact or approximate equivalent of the following formula:

$$i = \mathrm{Sign}(C) * \mathrm{Floor}((Abs(C) + S - Z/2)/S)$$

where C is the original transform coefficient value to be quantized, S is the quantization step size, Z is control parameter that is greater than zero and is referred to as the dead-zone width, and the functions are defined as follows:

Abs(x) is the absolute value function, which returns the value x for x>0 and otherwise returns the value −x.

Floor(x) is the floor function, which returns the largest integer that is greater than or equal to x.

Sign(x) is equal to 1 for x>0, equal to −1 for x<0; and otherwise is equal to 0.

The result of this process, denoted by the symbol i, is sometimes referred to as the quantization index value for the transform coefficient.

The range of input values from −Z/2 to +Z/2 is referred to as the dead-zone of the quantizer, since the quantization index output i will be equal to 0 for any input value in this range, thus making the output i of the quantization process the same as the output of the operation of the quantization process would be for the input value C=0.

In the simplified mid-tread scalar quantizer model employing a uniform quantization step size, the operation of the inverse quantization process in the decoder is performed using some equivalent of the following formula:

$$C' = \mathrm{Sign}(i) * (Abs(i) * S + R)$$

where C' is the approximate inverse of the quantization process, R is a reconstruction offset parameter, and other terms are as defined above. Note that the value of C' for i=0 will be equal to 0 due to the definition of the Sign( ) function. The mid-tread part of the description of this quantizer model refers to this property of having a dead-zone region that results in reconstructed coefficient value of 0.

The values of S, Z and R can depend on various elements of the encoder and decoder design. The value of the quantization step size S is used by both the encoder and the decoder, while in this model the value of Z is used only by the encoder and the value of R is used only by the decoder.

In some cases, an encoder design may make use of the ability to independently select the dead-zone width Z without necessarily affecting the decoding process, and in some cases a decoder design may make use of the ability to independently choose the applied reconstruction offset R. Also, in some cases a decoder design may select a different reconstruction value than 0 for transform coefficient indexes having the value i=0, under certain circumstances—although this practice deviates from the mid-tread scalar quantizer model.

Various other differences in the way an encoder or decoder may operate may also be present in particular encoder and decoder designs. For example, the reconstruction offset value R may depend on the value of i or on other conditions determined during the decoding process.

For purposes of this exposition, a coefficient is referred to as being quantized to zero for cases in which the output of the forward quantization process (e.g. the value of i) is the same as it would be if the transform coefficient C had been equal to 0. The term is used in the general sense, regardless of whether the quantizer operation precisely follows the simplified mid-tread scalar quantizer model or not. In the simplified mid-tread scalar quantizer model, all input values within the dead-zone are quantized to zero.

In typical usage, all data that is quantized to zero will be reconstructed to have the value zero by the approximate inverse quantization stage of the decoding process. In the simplified mid-tread quantizer model, all input values that are quantized to zero by the encoder are also reconstructed to the value 0 by the decoder.

I. Lifting Operations

In an exemplary implementation, transform operators are implemented using a signal processing structure that is well known in the art as "lifting". Lifting involves applying a specific type of cascaded operations to construct a reversible signal flow graph.

The lifting structure is reversible irrespective of the actual operators that are involved in some parts of these operations. The inverse operator can be obtained by reversing the order of the stages of the structure and applying the opposite sign to the output of each operator (i.e. replacing addition with subtraction and vice versa.) Transform operators implemented through lifting are thus reversible.

In some embodiments rounding is also involved. Consider the last (right-most) operation of a forward flow graph. It is constructed as $x'=x+f(y)$, where $f(y)$ is the result of rounding the scaled value of y. In conventional lifting, $f(y)$ corresponds to Round$(s*y)$, where s is a scale factor. But $f(y)$ could actually be any function. For the inverse operation, the first (left-most) operation of the reverse flow graph is to subtract $f(y)$ from $x'$. if $x'=x+f(y)$, then it must be the case that $x'-f(y)=x$, and the last lifting step has thus been inverted—i.e., the value of x has been recovered exactly. Inversion then continues, moving left to right on the inverse side to subtract off each term that was added in reverse order on the forward side.

A convention followed when drawing the lifting diagrams, such as the ones shown here, is that when an arrow for one signal meets the path for another signal, two operations occur:

1) an addition operation is implied at that location, and
2) if the value that results from application of a scale factor is not an integer (e.g., due to multiplying an integer by a number that is not an integer), some type of rounding or truncation to an integer value is applied to the scaled signal prior to performing the addition operation.

Lifting is typically used as a process of performing an approximate matrix-vector multiplication using successive "shears." A shear is defined as a multiplication of the operand vector with a matrix which is an identity matrix plus one non-zero off-diagonal element. Sign inversion of one or more vector coefficients may occur anywhere during this process, without loss of generality. The presence of rounding error in the operation of the component shear operators will not affect the reversibility of the resulting signals, provided the inverse operations are constructed in the appropriate manner.

The shear operators implemented herein are, e.g., of the following form: $y+=(i*x+r)>>b$ using the C programming language conventions for mathematical processing descriptions, where i is a small integer, and r and b are small non-negative integers. Thus, a shear operator generally involves a multiplication (by i), a right shift (by b bits), and a rounding control factor (r). For example, $y+=(3*x+4)>>3$ is a shear operator. This operator can be depicted in a signal flow graph as ↑3/8 in which the numerator of the illustrated fraction is the value of i and the right shift by b bits is illustrated by the denominator value $2^b$. The right shift operation in such a shear operator (when b is greater than 0) will typically introduce some rounding error into the result of the matrix multiplication, but without affecting reversibility, as the value of the original value of y that existed prior to operation of the shear operator can be recovered by subtracting $(i*x+r)>>b$ from the modified value of y (provided the value of x is available; this is always the case if all shear operations are applied in reverse order during the transform inversion process.)

The shear is termed a trivial lifting step if $i=1$, $b \leq 1$ and $r=0$ since, in such cases, no multiplication is needed, and as a non-trivial lifting step otherwise. If $i=\pm 1$ and $b=r=0$, the shear operation reduces to a simple addition.

2. DC Leakage Amelioration

In one implementation, DC leakage can be introduced by the photo overlap transform (POT). The next section discusses the POT in greater detail.

2.A. Photo Overlap Transform (POT)

The photo overlap transform (e.g., 365 and 375 of FIGS. 3 and 470, 480 of FIG. 4) is an optional operator that can applied in both stages of the hierarchical transform. This operator is optional in the sense that the encoder can choose whether to apply this transform or not, and then indicate its choice to the decoder so that the decoder can then apply or not apply the corresponding inverse processing steps. This embodiment discusses a 4×4 POT which applies to a group of 16 pixels that are grouped from 4 different blocks, i.e., the POT overlaps across block boundaries.

Figure 8A:
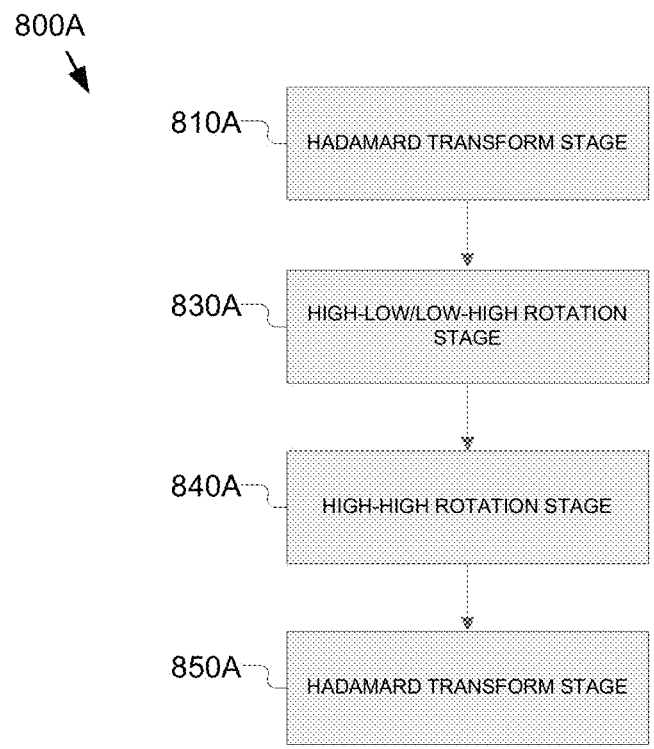
FIG. 8A is a block diagram of a photo overlap transform without a scaling stage.

With reference to FIG. 8, an exemplary implementation, if a 4×4 block forming the input to the POT operation is given by the matrix $$\begin{bmatrix} a & b & c & d \\ e & f & g & h \\ i & j & k & l \\ m & n & o & p \end{bmatrix},$$

the stages to implement the 4×4 POT 800 at the encoder are:

1. Hadamard transform stage 810:
$T_H$ (a, d, m, p), $T_H$ (b, c, n, o), $T_H$ (e, h, i, l), $T_H$ (f, g, j, k)
2. Scaling stage 820:
$T_S$ (a, p), $T_S$ (b, l), $T_S$ (e, o), $T_S$ (f, k)
3. High-low/low-high rotation stage 830:
$T_{Ro}$ (n, m), $T_{Ro}$ (j, i), $T_{Ro}$ (h, d), $T_{Ro}$ (g, c)
4. High-high rotation stage 840:
$T_{odd-odd}$ (k, l, o, p)
5. Hadamard transform stage 850:
$T_H$ (a, d, m, p), $T_H$ (b, c, n, o), $T_H$ (e, h, i, l), $T_H$ (f, g, j, k)

Figure 9:
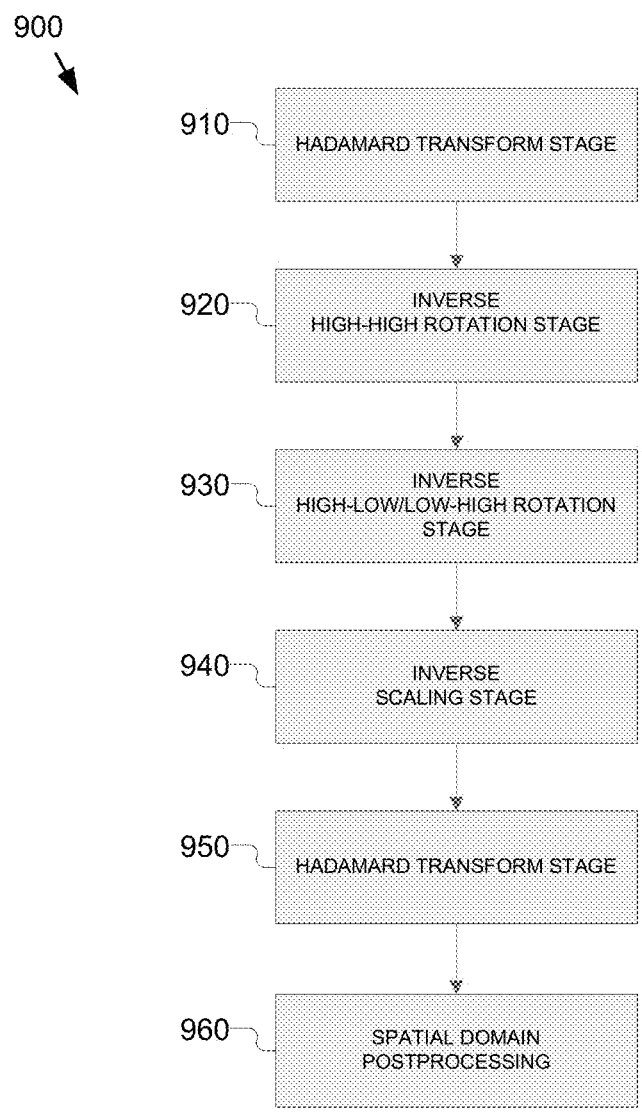
FIG. 9 is a block diagram of an inverse photo overlap transform.

FIG. 9 describes an inverse POT 900 implemented by a decoder. As the 4×4 POT consists of lifting operations, the inverse POT at the decoder is derived by reversing the lifting steps.

The steps to implement the inverse POT are:

1. Hadamard transform stage 910:
$T_H$ (a, d, m, p), $T_H$ (b, c, n, o), $T_H$ (e, h, i, l), $T_H$ (f, g, j, k)
2. Inverse High-high rotation stage 920:
$T_{odd-odd}^1$ (k, l, o, p)
3. Inverse High-low/low-high rotation stage 930:
$T_{Ro}$ (n, m), $T_{Ro}$ (j, i), $T_{Ro}$ (h, d), $T_{Ro}$ (g, c)
4. Inverse Scaling stage 940:
$T_S^1$ (a, p), $T_S^1$ (b, $T_S^1$ (e, o), $T_S^1$ (f, k)

5. Hadamard transform stage 950:

$T_H$ (a, d, m, p), $T_H$ (b, c, n, o), $T_H$ (e, h, i, l), $T_H$ (f, g, j, k) where the operator $T_{odd-odd}^1$, $T_{Ro}^1$ and $T_S^1$ are the inverses of the corresponding operators $T_{odd-odd}$, $T_{Ro}$ and $T_S$ respectively. Note that the operator $T_H$ is an inverse for itself.

In some implementation, DC leakage in the POT operator results from the scaling stage 820; the effects of this stage are analyzed in detail in the next section.

2.B. Scaling Stage in the POT

Figure 10:
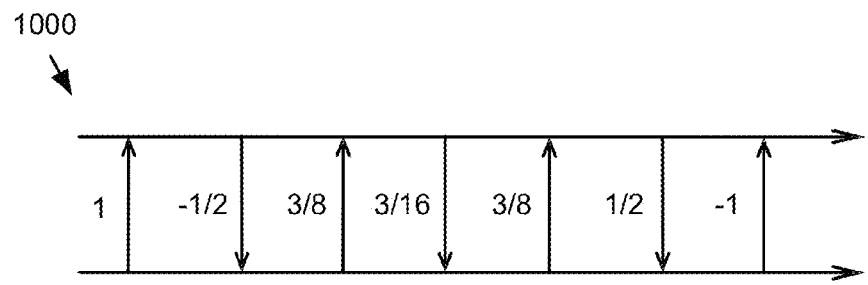
FIG. 10 is a signal flow graph of a scaling operator performed using lifting operations.

In an exemplary implementation, the forward scaling stage (stage 2 in the POT, above, performed at the encoder), and its inverse, (stage 4 in the inverse POT, above, performed at the decoder), are defined by the set of lifting operations 1000 shown in FIG. 10. These lifting operations implement a 2-point scaling operator.

Figure 11:
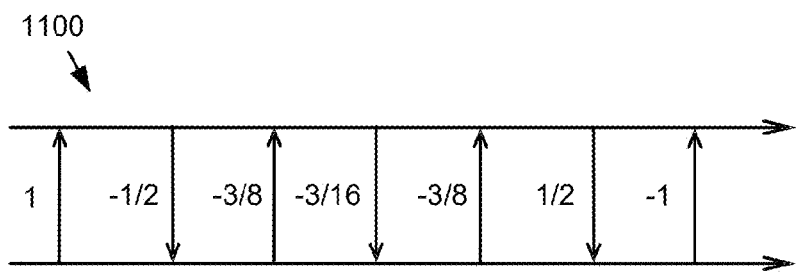
FIG. 11 is a signal flow graph of an inverse scaling operator performed using lifting operations.

FIG. 11 at 1100 defines an implementation of the corresponding inverse scaling operator. Some of the actual lifting operations in FIGS. 9 and 10 may be avoided in certain implementations by subsuming them together with other processing elements, with the result that the actual calculations that are performed may not be ordinarily performed exactly as shown in the diagram, though they are mathematically equal (or closely equivalent) in result.

Ignoring non-linearities caused due to rounding, the scaling stage in POT (820, FIG. 8) can be represented using 2×2 matrices.

In matrix notation, the forward scaling stage can be represented as $$\begin{bmatrix} \alpha & \beta \\ \chi & \delta \end{bmatrix},$$

Where x=3/8, and y=3/16.

Using the matrix naming convention $$\begin{bmatrix} 0.6887207 & +0.0065918 \\ -0.0065918 & 1.4519043 \end{bmatrix} \text{ (Scaling Matrix)}$$

the entries $\alpha$ and $\delta$ are diagonal entries, and the entries $\beta$ and $\gamma$ are the off-diagonal entries.

If the off-diagonal entries of the resulting scaling matrix are zero, then the DC leakage would be zero.
However, the resulting scaling matrix is $$\begin{bmatrix} 1.4519043 & -0.0065918 \\ 0.0065918 & 0.6887207 \end{bmatrix} \text{ (Inverse Scaling Matrix)}$$

The off-diagonal entries in the scaling matrix are not zero, causing of DC leakage in the forward transform at the encoder.

The inverse scaling matrix (940, FIG. 9) in the inverse POT can be represented using the matrix:

$$\begin{bmatrix} 1.4519043 & -0.0065918 \\ 0.0065918 & 0.6887207 \end{bmatrix} \text{ (Inverse Scaling Maxtrix)}$$

The off-diagonal entries in the inverse scaling matrix are also not zero, and this is the cause of DC leakage in the inverse transform at the decoder.

One approach to DC leakage mitigation is to redesign the scaling matrix and/or the inverse scaling matrix so that the off-diagonal elements are zero, or are closer to zero that the current values. We call these embodiments transform redesign solutions. Other objectives of the transform design are as follows:

To maintain the reversibility of the transform in the absence of quantization.

To preserve the compression capability of the transform.

To maximize compression capability and have minimal DC leakage, an exemplary ideal scaling matrix would have diagonal elements $\alpha$ and $\delta$ that closely approximate $\alpha$=1/Sqrt(2) and $\delta$=Sqrt(2), respectively, and would have off-diagonal elements that are approximately equal to zero, as coding and/or compression gain of the resulting transform is maximized if $\alpha$=1/Sqrt(2) and $\delta$=Sqrt(2), respectively.

2.B.1: Eliminating the Scaling Stage Embodiments

In one embodiment, the scaling stage (820, FIG. 8) is eliminated in the POT at the encoder, and the corresponding inverse scaling stage (940, FIG. 9) is eliminated in the inverse POT at the decoder. This embodiment is illustrated with reference to FIG. 8A, at 800, where the first hadamard transform stage 810A is followed immediately by the high-low/low-high rotation stage 830A. The high-high rotation state 840A and the hadamard transform stage 850A follow without other changes. This corresponds to a scaling stage being equal to the identity matrix, in which the off-diagonal elements corresponding to DC leakage are both equal to 0.

Figure 9A:
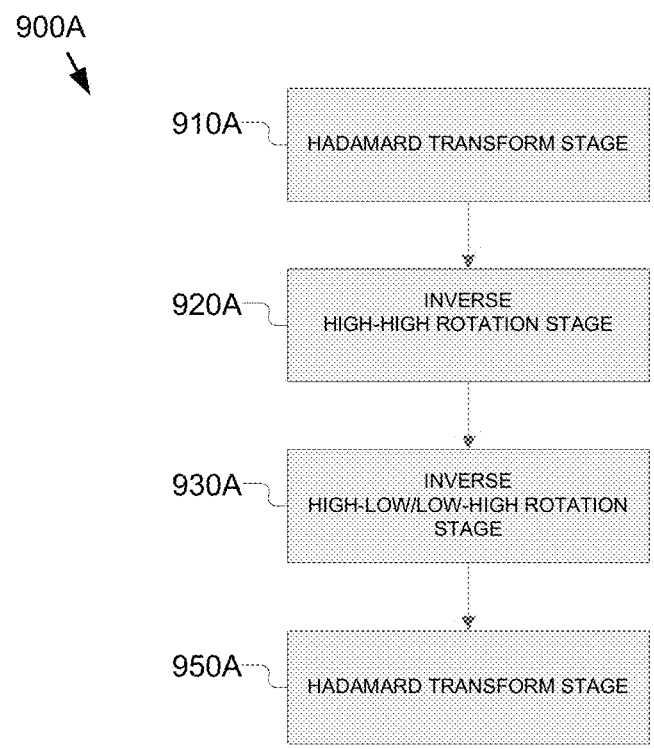
FIG. 9A is a block diagram of an inverse photo overlap transform without a scaling stage corresponding to the photo overlap transform of FIG. 8A.

A corresponding IPOT for use at a decoder for this embodiment is shown in FIG. 9A at 900. In it, the inverse high-low/low-high rotation stage 930 is immediately followed by the second Hadamard transform stage 950A; the first Hadamard transform stage 910A and the inverse high-high rotation stage 920A are unchanged.

This turns the transform into an orthogonal transform instead of a bi-orthogonal transform without DC leakage. Note that the diagonal elements of the corresponding scaling matrix are (1, 1) in such a case, which may lead to some compression capability penalty.

2.B.2: Changing Scaling in the POT at the Encoder Using Lifting Steps Embodiments In a second embodiment, the scaling stage (820, FIG. 9) in the POT at the encoder is replaced with a scaling of (0.5, 2). The value 0.5 corresponds to $\alpha$ in the scaling matrix and 2 corresponds to $\delta$ in the scaling matrix. The corresponding inverse scaling of (2, 0.5) is used in the scaling stage 940 in the inverse POT at the decoder.

Figure 12:
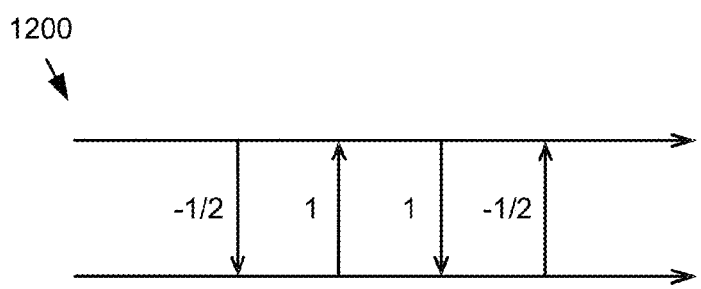
FIG. 12 is a signal flow graph of a modified scaling operator performed using lifting operations as used in embodiments taught herein.

This can be implemented in a reversible way using only lifting steps in the encoder as using a modified two-point scaling operator 1200, as shown in FIG. 12. Basically, this signal flow graph depicts four shear operators $$\downarrow -\frac{1}{2},$$

Figure 13:
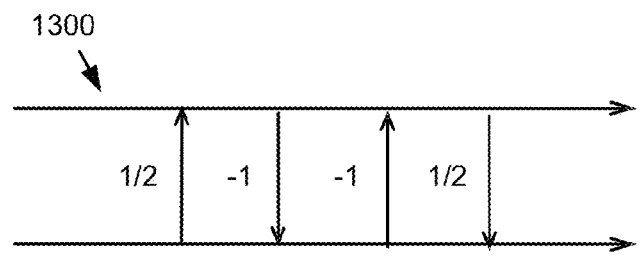
FIG. 13 is a signal flow graph of the inverse scaling operator implementing the inverse scaling of the signal graph of FIG. 12.

$\uparrow 1, \downarrow 1$, and $$\uparrow \frac{-1}{2},$$

performed successively. The corresponding modified two-point inverse scaling operator 1300 performed at the decoder is shown with reference to FIG. 13. Basically, this signal flow graph depicts four shear operators $\uparrow \frac{1}{2}$, ↓−1, ↑−1, and $\downarrow \frac{1}{2}$ performed successively.

The resultant scaling matrix has off-diagonal elements equal to zero, corresponding to zero DC leakage. However, as the diagonal scaling matrix elements α and δ are (0.5, 2), there may be some compression capability penalty as the values 0.5 and 2 are not very close to the ideal compression values of 1/Sqrt(2), and Sqrt/2, respectively.

2.B.3: Changing Scaling in the POT at the Encoder Using Reversible Modulo Arithmetic Steps and Lifting Steps In this embodiment, the original scaling stage (820, FIG. 8) and the corresponding inverse scaling stage (940, FIG. 9), shown with reference to FIGS. 10 and 11, are replaced. The other stages remain the same. Instead, a scaling of (2/3, 3/2) (α and δ values in the scaling matrix) is used in the POT at the encoder, and a corresponding inverse scaling of (3/2, 2/3) is used in the inverse POT at the decoder. Since powers of two are required for the lifting steps, and the scaling factor 3 is not a power of 2, the scaling, in an exemplary embodiment, is implemented using reversible modulo arithmetic steps prior to the lifting stages.

Invertible approximate scaling by scaling factors (1/M, M) can be performed as follows:
Input data is (x1, x2)
Set y1=floor(x1/M)
Set y2=x1+(x2−y1)*M
Output data is (y1, y2).
where the function floor(a) denotes the largest integer less than or equal to the argument a.

Note that the step "y2=x1+(x2−y1)*M" is equivalent to "y2=x2*M+(x1 mod M)" where (a mod b) indicates the modulo remainder that can be equivalently computed as (a mod b)=a−b*floor(a/b)

Figure 14:
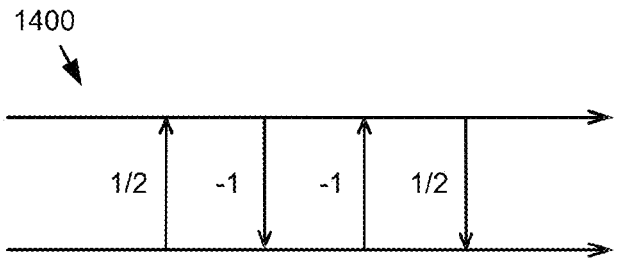
FIG. 14 is a signal flow graph of a modified scaling operator performed using lifting operations as used in embodiments taught herein.

The scaling by (2/3, 3/2) can be performed as follows:
First, perform the scaling of (1/3, 3) as
Set y1=floor(x1/3)
Set y2=M*x2+y1*3
and then set x1=y1 and x2=y2.
Next, perform the scaling by factors (2, 1/2) using the lifting steps 1400 shown with reference to FIG. 14. Basically, this signal flow graph depicts four shear operators $\downarrow \frac{1}{2}$, ↓−1, ↑−1, and $\uparrow \frac{1}{2}$, performed successively.
The matrix operations, above, can be perfectly inverted as follows:

Input data is (y1, y2)
Set x2=floor(y2/M)
Set x1=y2+(y1−x2)*M
Output data is (x1, x2).

Figure 14A:
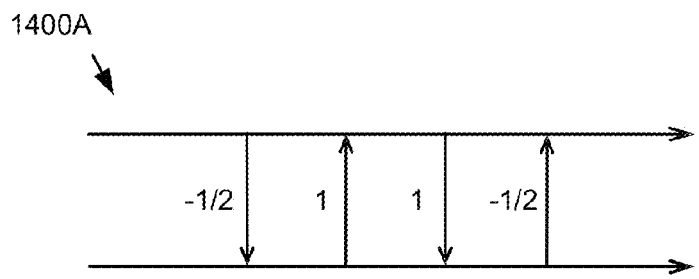
FIG. 14A is a signal flow graph of a modified inverse scaling operator implementing the inverse scaling of the signal graph of FIG. 14.

At the decoder, the inverse scaling stage (940, FIG. 9) is replaced by the following operations.
1. First, invert the previous matrix scaling operations of (1/3, 3):
Input data is (y1, y2)
Set x2=floor(y2/M)
Set x1=y2+(y1−x2)*M
Output data is (x1, x2).
2. Next, perform the lifting steps 1400A as shown in FIG. 14A. Basically, this signal flow graph depicts four shear operators $\downarrow -\frac{1}{2}$, ↑1, ↓1, and $\uparrow \frac{-1}{2}$, performed successively.

This gives a scaling matrix with off-diagonal elements equal to zero, corresponding to zero DC leakage.

Since the diagonal elements in the resulting scaling matrix are (2/3, 3/2), which closely approximate (1/Sqrt(2), Sqrt(2)), there is no significant penalty to compression capability.

2.B.4: Adding Additional Lifting Steps to the Scaling Process at the Encoder

In other embodiments, lifting steps are added to the existing scaling process (820, FIG. 8) to reduce DC leakage. Consider the following generalized representation of the existing lifting stage:

Generalized representation of 2-point scaling operator      Drawing 1

$\underbrace{\uparrow -1/2 \downarrow x \uparrow y \downarrow x \uparrow 1/2 \downarrow -1 \uparrow}$.

The magnitude of the off-diagonal term of the resulting is given by y−0.5*(x+x*x*y/2)

The off-diagonal terms of the scaling matrix (equation 1) will be zero only if $$y = \frac{2x}{4-x^2}$$

By carefully optimizing the values of x and y, the magnitude of the off-diagonal elements that contribute to DC leakage can be reduced, while ensuring that the diagonal terms approximate (1/sqrt(2), sqrt(2)) and thus maximize compression capability.

The new transform may be designed to provide some level of compatibility with the old transform, i.e., a decoder using the old inverse transform can reconstruct images created using the new forward transform and still produce reasonable images. One simple metric to estimate this compatibility is A=(FwdScalingNew*InvScalingOld−I), where FwdScalingNew is the new forward scaling matrix, InvScalingOld is the old inverse scaling matrix, and I is the identity matrix.

The deviation of matrix A from zero is a good estimate of incompatibility between the old and new transforms.

Another advantage of this approach is that the value of the parameter x can be retained at the original value, e.g., 3/8, while the value of only a single parameter, y, can be tuned to achieve this objective.

If the parameter y can be expressed as a rational number having a denominator that is an integer power of two, it will be relatively easy to implement the new scaling approach using lifting steps. For the value of x=3/8, some of the choices of y that satisfy this criteria are y=199/1024 (=3/16+1/128−1/1024).
y=25/128 (=3/16+1/128).
y=99/512 (=3/16+3/512).
y=49/256 (=3/16+1/256).

The amount of DC leakage, values of on-diagonal terms and the compatibility metric for these choices is depicted in the following table along with some remarks about implementation complexity for particular choices.

are replaced in the corresponding lifting steps 1605, 1615 with the value 3/8; and the y value lifting step 1510 is replaced with 199/1024 in the corresponding lifting step 1610.

At the decoder, the inverse scaling operator 940 (FIG. 9) is replaced with the generalized inverse scaling operator 1500A. Specifically, the x value lifting steps 1505A, 1515A, of FIG. 15A are replaced with the value −3/8; and the y value lifting step 1510A is replaced the corresponding −y value −199/1024.

Implementing solution 4.b entails replacing the value of lifting step 1610 with the value 25/128; implementing solution 4.c entails replacing the value of lifting step 1610 with 99/512, and implementing solution 4.d entails replacing the value of lifting step 1610 with 49/256. All other lifting steps remain the same.

Figure 17:
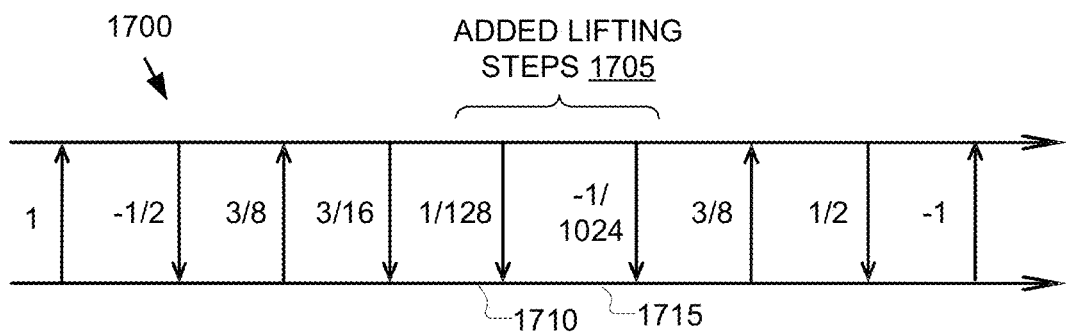
FIG. 17 is a signal flow graph of a modified scaling operator with added lifting steps as used in alternate embodiments taught herein.
Figure 17A:
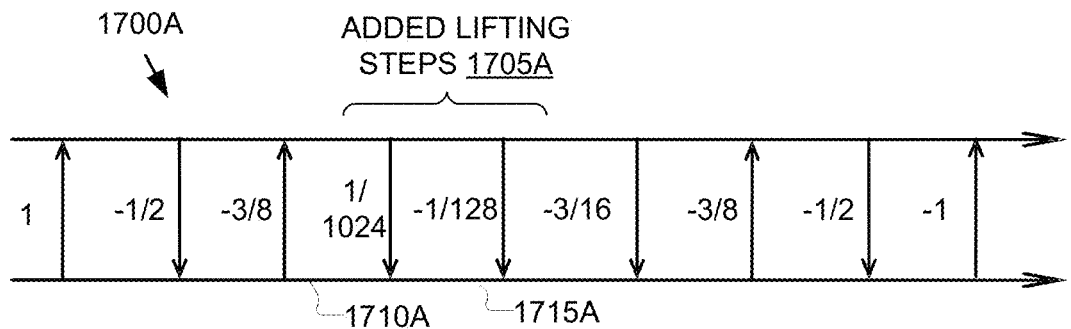
FIG. 17A is a signal flow graph that is the inverse of the scaling operator of FIG. 17 as used in alternate embodiments taught herein.

An alternate implementation of the two-point scaling operator solution $T_S$ 4.a is shown at 1700 with reference to FIG. 17.

This implementation 1700 shows that the solution 4.a uses two additional add and two additional shift operations, 1705, e.g., the lifting steps 1/128 (1710) and −1/1024 (1715) when compared to operation using the original scaling shown in

| Solution | On-diagonal terms | DC leakage | Compatibility Metric | Implementation Complexity |
| --- | --- | --- | --- | --- |
| Old Scaling | 0.6887207, 1.4519043 | 0.0065918 | 0 0 0 0 | |
| Solution 3 | 0.6666667, 1.5 | 0 | −0.032063802 −0.004394531 0.009887695 0.033081055 | |
| Solution 4.a (y = 199/1024) | 0.684207916259765, 1.46154403686523 | 3.8147E−06 | −0.006595612 −0.004512787 0.00963974 0.006595612 | 2 additional shifts and 2 additional adds |
| Solution 4.b (y = 25/128) | 0.6835632, 1.4629211 | 0.0009460 | −0.007537842 −0.005157471 0.011016846 0.007537842 | one additional shift and one additional add |
| Solution 4.c (y = 99/512) | 0.68614197, 1.4574127 | 0.002822876 | −0.003768921 −0.002578735 0.005508423 0.003768921 | one additional shift and one additional add |
| Solution 4.d (y = 49/256) | 0.684852600097656, 1.46016693115234 | 0.00093841552734 | −0.005653381 −0.003868103 0.008262634 0.005653381 | Requires one multiply, one shift, and one add |

Based on these metrics, solution 4.a, which sets the value of parameter y to 199/1024, produces the smallest DC leakage. Further, since the diagonal elements (a, d) of the scaling matrix approximate (1/sqrt(2), sqrt(2)), it also provides good compression capability. This embodiment also provides some degree of compatibility with the existing transform, as can be seen from the compatibility metric. Thus, existing decoders and encoders using the default scaling stage will retain some degree of compatibility with new decoder and new encoder that use the scaling stage described by solution 4.a.

Figure 15:
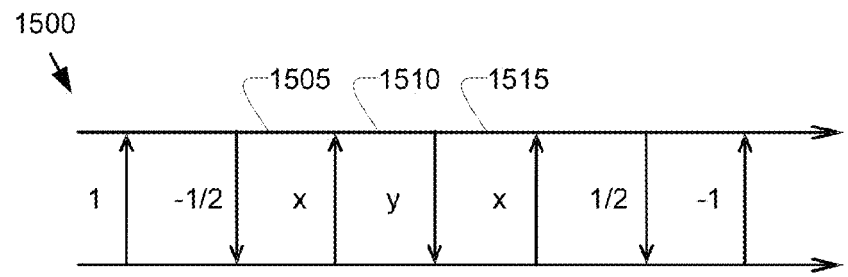
FIG. 15 is a signal flow graph of a generalized representation of a two point scaling operator performed using lifting operations.
Figure 15A:
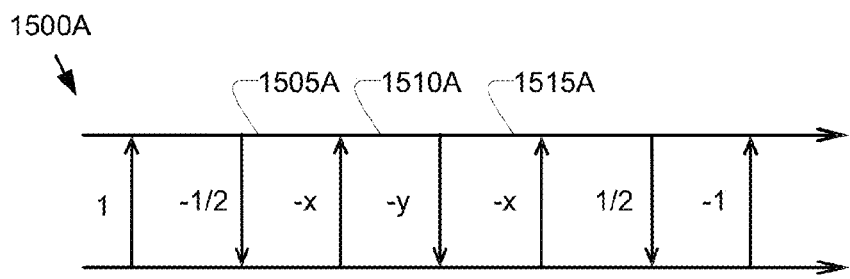
FIG. 15A is a signal flow graph of a of the inverse of the generalized scaling operator shown in FIG. 15.

Solutions 4.a, 4.b, 4.c and 4.d may be implemented using the generalized representation of a two point scaling operator 1500, as shown in FIG. 15, where each of the lifting steps with the value of x 1505, 1515 are set to 3/8 and the lifting step with the value of y 1510 is set to 199/1024 (for 4.a), 25/128 (for 4.b), 99/512 (for 4.c), and 49/256 (for 4.d), respectively.

Figure 16:
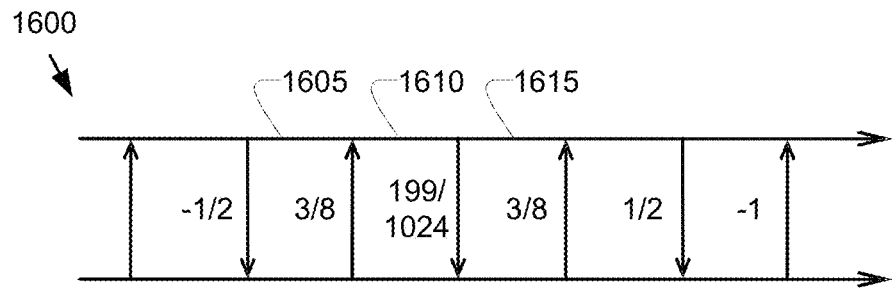
FIG. 16 is a signal flow graph of a modified scaling operator as used in embodiments taught herein.

In particular, solution 4.a may be implemented at the encoder by replacing the scaling operator 820 (FIG. 8) with the two point scaling operator $T_S$ as shown at 1600 in FIG. 16. Specifically, the x value lifting steps 1505, 1515, of FIG. 15

FIG. 10. The multipliers used in the implementation 1710, 1715 are also very small integers, which is indicative of low computational resource requirements in terms of minimizing processing wordlength and enabling multiplication operations to be easily decomposed into a small number of simple shift and add operations. The inverse scaling operation performed at the decoder in place of the scaling operator 940 is shown at 1700A with reference to FIG. 17.

With continuing reference to FIG. 15, other alternate X and Y values (shown below) may be implemented at the encoder as certain lifting steps in a scaling operation 1500 (e.g., in the place of the scaling stage 820, with reference to FIG. 8.)

To implement any of the alternate scaling stages 1-5, below, the x value, below would be used as the value for the lifting steps 1505, 1515, and the y value, below, would be used for the lifting step 1510.

1. x=3/8 with y=50943/$2^{18}$,
2. x=3/8 with y=1630175/$2^{23}$,
3. x=3/8 with y=6520699/$2^{25}$, 4. $x=317/2^{18}$ with $y=10393/2^{16}$,
5. $x=397/2^{10}$ with $y=825/2^{12}$.

For example, the scaling stage for the implementation of alternate 1 would use as the value for the lifting steps X 1505, 1515 the value 3/8; the value for the lifting step y 1510 would be $50943/2^{18}$. A corresponding decoder would then use for the inverse scaling stage 940 (FIG. 9), the inverse scaling operator 1500A with the x value, above, being used as the value for the lifting steps 1505A, and 1515A, and the corresponding y value, above, being used for the lifting step 1510A. For example, the inverse scaling stage for the implementation of alternate 2 would use as the value for the lifting steps X 1505A, 1515A the value −3/8; the value for the lifting step y 1510 would be $-1630175/2^{23}$.

2.C. Decoder-Side DC Leakage Compensation

In some embodiments, the existing scaling stage 820 (FIG. 8) at the encoder is retained without modification, and thus the forward (800, FIG. 8) and inverse (900, FIG. 9) POT transforms are retained without modification. However, the decoder optionally performs additional steps to mitigate the effect of decoder side DC leakage. Note that the decoder side DC leakage compensation embodiment approach provides compatibility with existing encoders and bitstreams, with the effect that such implementation have complete (or near-complete) backward compatibility with existing encoders; e.g., existing encoders do not require modifications.

Figure 18:
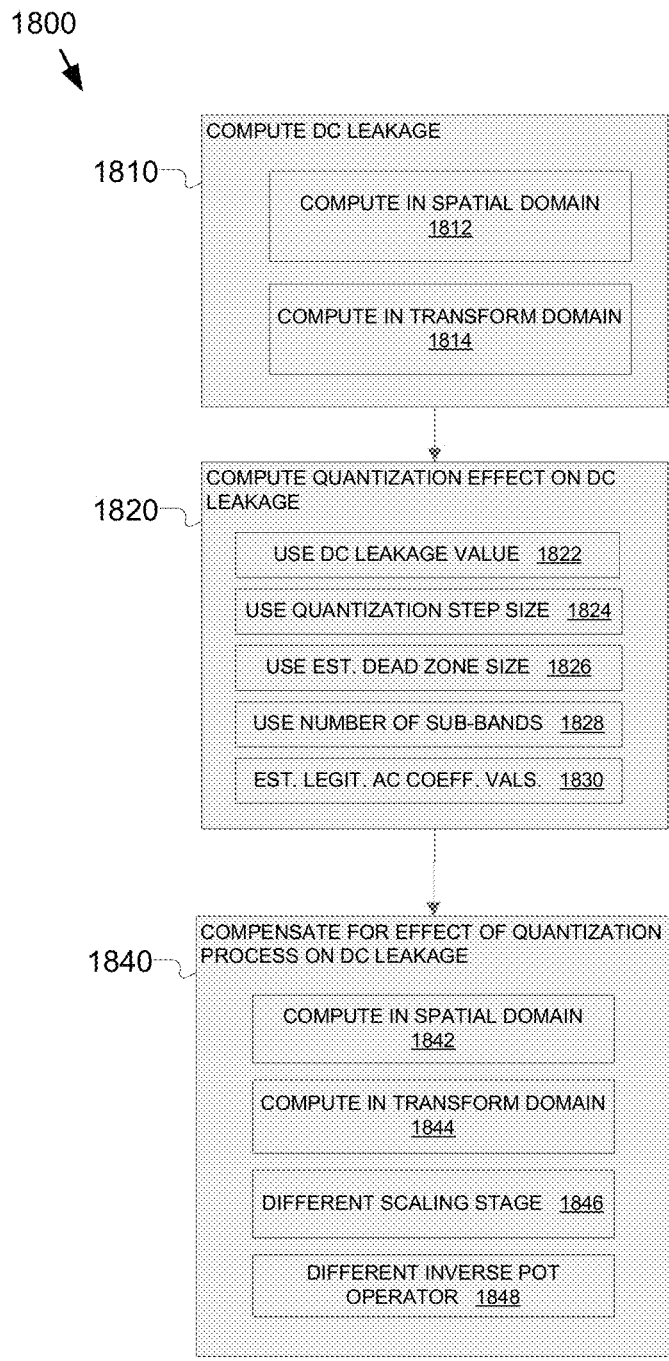
FIG. 18 is a block diagram showing embodiments of decoder-side leakage compensation as used in embodiments taught herein.

Decoder side DC Leakage compensation comprises, e.g., three stages, as shown with reference to FIG. 18.

Figure 19:
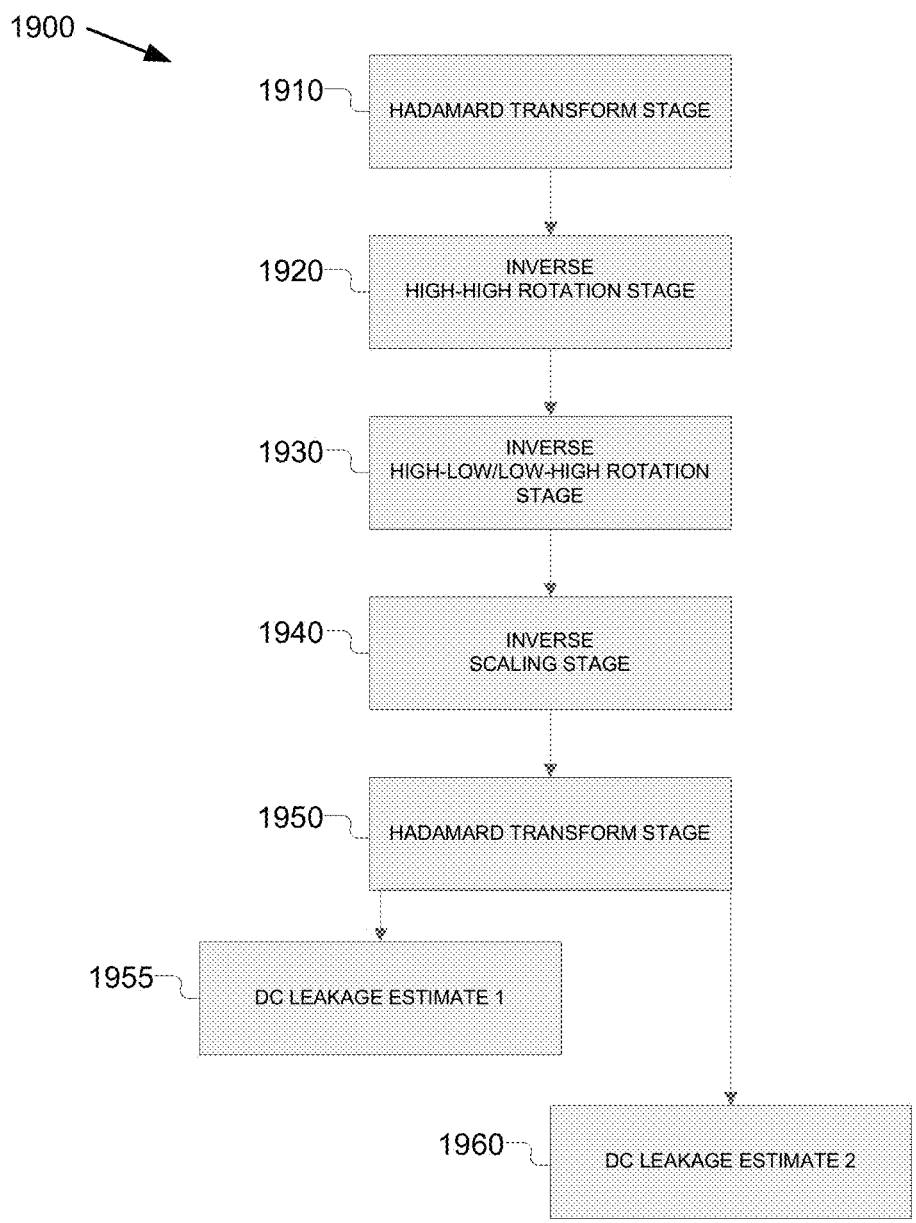
FIG. 19 is a block diagram showing embodiment of determining decoder-side leakage using the decoder-side transforms of FIG. 9.

In a first stage 1810, the amount of DC leakage is computed based on processes within the transform process and the DC value of the corresponding coefficients. This can be done either in the spatial domain 1812 using the pixel values; in which case it is performed at the end of the inverse POT process after the hadamard transform stage (e.g., 960 in FIG. 9), or in the frequency domain 814 using the coefficients in the intermediate steps of the inverse POT process (1910-1940, FIG. 19).

In a second stage 1820, the effect of the quantization process on the encoder side DC leakage is estimated. This is based on one or more of, e.g., the DC leakage value 1822 determined in stage 1, the quantization step size 1824, the estimated dead-zone size 1826, the number of subbands that are present in the bitstream 1828 and other such criteria. This stage can also involve estimation of the effect of "legitimate" AC coefficient values (i.e. AC coefficient values that are not due to the DC leakage effect) 1830 that are also present due to the actual signal characteristics, and that are not related to the DC leakage.

In a third stage 1840, compensation is made for the effect of the quantization process on the DC leakage. If the encoder side AC coefficient values are estimated to contain DC leakage effects but these coefficients have been quantized to zero, the corresponding estimated amount of leakage is added at the decoder. This addition can be done either in the spatial domain 1842 after the inverse POT process is finished, (e.g., 960 in FIG. 9), or in the frequency domain 1844 in the intermediate steps of the inverse POT process (e.g., 1910-1940, FIG. 19). Another embodiment (or in combination with any of the embodiments discussed herein) uses a different scaling stage 1849 (or different inverse POT operator 1848) when DC leakage is detected by using an existing POT operator.

If the computation of DC leakage quantity and compensation for this effect are performed in the spatial domain, (e.g., 960 in FIG. 9) this process may be considered to be "post processing" (i.e., an operation performed as a separate stage after performing the entire ordinary decoding process 900 (FIG. 9) as it would have been performed in the absence of this leakage effect compensation.) If the leakage computation and compensation are performed in the frequency domain during the inverse POT, (910-950, FIG. 9) this process may be considered to be a "coefficient adjustment" that becomes part of the inverse transformation process.

This embodiment can work in conjunction with preprocessing at the encoder; e.g., the bitstream may include a signal that encoder processing was used to mitigate the encoder side DC leakage. Such a signal may be in the image header data. If the signal is present, the decoder may use this signal information to tune the DC leakage compensation algorithm.

The next section explains one such post-processing algorithm in greater detail. In the exemplary embodiment, the DC leakage computation and the compensation are performed in the spatial domain after the inverse POT (960, FIG. 9) has been performed. The subsequent section describes a coefficient adjustment embodiment performed prior to the application of the inverse POT in greater detail.

2.C.1: Spatial Domain Post-Processing Embodiment:

This section describes various operations that may estimate DC leakage. An embodiment can use these processes independently, or an individual process may be used in conjunction with other processes to estimate the amount of DC leakage and, depending upon amount of DC leakage, to determine whether leakage compensation is needed.

To compensate for DC Leakage, first, the amount of DC leakage is computed. If a 4×4 block forming the input to the Inverse POT operation is given by the matrix $$\begin{bmatrix} a & b & c & d \\ e & f & g & h \\ i & j & h & l \\ m & n & o & p \end{bmatrix},$$

with each letter representing a coefficient value, the steps to implement the Inverse POT are (with reference to FIG. 19)
1. Hadamard transform stage 1910:
$T_H$ (a, d, m, p), $T_H$ (b, c, n, o), $T_H$ (e, h, i, l), $T_H$ (f, g, j, k)
2. Inverse High-high rotation stage 1920: $T_{odd\text{-}odd}^1$ (k, l, o, p)
3. Inverse High-low/low-high rotation stage 1930:
$T_{Ro}^1$ (n, m), $T_{Ro}^1$ (j, i), $T_{Ro}^1$ (h, d), $T_{Ro}^1$ (g, c)
4. Inverse Scaling stage 1940:
$T_S^1$ (a, p), $T_S^1$ (b, l), $T_S^1$ (e, o), $T_S^1$ (f, k)
5. Hadamard transform stage 1950:
$T_H$ (a, d, m, p), $T_H$ (b, c, n, o), $T_H$ (e, h, i, l), $T_H$ (f, g, j, k)
(Recall that the Hadamard transform stage 950 is its own inverse.)

The decoder side DC leakage, in some embodiments, is introduced in the scaling stage 1940; and, as can be seen, this is followed by the Hadamard stage 1950. Thus, it is important to estimate the effect of the Hadamard stage 950 on the DC leakage.

Let us as assume that in a 4×4 block all the variables are equal to a particular value x. That is, a=b=c=d=e=f= . . . =p=x.

After the first Hadamard transform stage (i.e., stage 1, 1910), only the variables a, b, e and f will be non-zero (they will have the value 2*x), and the remaining variables will be zero. That is, the variables a, b, e and f will be the ones that will experience DC leakage.

After applying the first inverse scaling stage 1949 transformation $T_S$ (a, p), the value of a is changed to 2*x*k1, and the value of p is changed to 2*x*k2, where k1 is the on-diagonal bottom element δ of the POT scaling matrix, and k2 is the off-diagonal element β of the scaling matrix. In the illustrated embodiment, k1=5947/4096 (approximately 1.4519) and k2=27/4096 (approximately 0.0065918).

The final step of the overlap operation at the decoder is the Hadamard operation 1950:

$T_H$ (a, d, m, p)

After applying $T_H$ (a, d, m, p), the value of a~=p~=x*k1+d1
d~=m~=x*k1−d1 where d1 is the decoder side DC leakage. Notice that the DC leakage effect is added to the values of a and p, while being subtracted from the value of d and m.

2.C.1.a: DC Leakage Estimate 1:

An embodiment can derive one estimate of leakage using the average of the four pixel values a, p, d, and m in the spatial domain, after the inverse POT has finished, 1950, as shown below:

$$\text{leak\_estimate1}=((a+p+d+m)/4)*k2/k1 \qquad \text{equation (2)}$$

where (a+p+d+m)/4 is the estimated DC value, k2 is the value of the POT scaling matrix element β, and k1 is the value of the POT scaling matrix element δ. In the illustrated embodiment, k2=27/4096 and k1=5947/4096.

This determines an estimate of the DC coefficient leakage solely, as it is computed from the DC value of the block. We can call this term nominal DC leakage.

2.C.1.b: DC Leakage Estimate 2:

Leakage compensation can be performed if the encoder side leakage introduced by the forward POT has been quantized to zero. This assumption is more likely to be valid when using large quantization step sizes (which corresponds to performing encoding at very low bit rates.)

At low to medium quantization step sizes (which correspond to performing encoding at higher bit rates), a part of the leakage introduced by the forward POT (e.g., as described in FIG. 8) may not be quantized to zero. Note that the leakage introduced by the forward POT (FIG. 8, at the encoder) is the inverse of leakage introduced by the inverse POT (FIG. 9, at the decoder), and, if not quantized to zero, will tend to cancel the effect of decoder side leakage.

Therefore, at higher bit rates, the magnitude of the actual decoder side leakage will be less than the nominal estimate obtained by using equation (2).

Another estimate of actual decoder side leakage can be derived (in the spatial domain, after the inverse POT has finished 1960) as follows:

leak_estimate2=(a+p−m−d)>>2 (where >> is an arithmetic right shift, and where a, p, m, and d are the spatial pixel values derived from the final Hadamard equation 1950).

Note that this estimate accounts for leakage introduced by the forward POT at the encoder due to quantization; i.e., if the quantization step size is very small and the leakage introduced by the forward POT at the encoder is preserved, this estimate should indicate that the actual DC leakage is small, in contrast to the nominal leak estimate from equation (2).

However, since this estimate is not computed from the DC value of the block, it may include contribution of actual AC energy in the block. In contrast, the nominal DC leakage estimate computed by equation (2) does not include the contribution of actual AC energy in the block.

An embodiment can derive the estimated DC leakage using any of the methods described in this section or using a different approach. If multiple estimates are obtained, some method is needed to combine the different estimates to obtain a better estimate. One such combination method is described below.

2.C.1.c: Combining Leakage Estimates

Figures 20, 21:
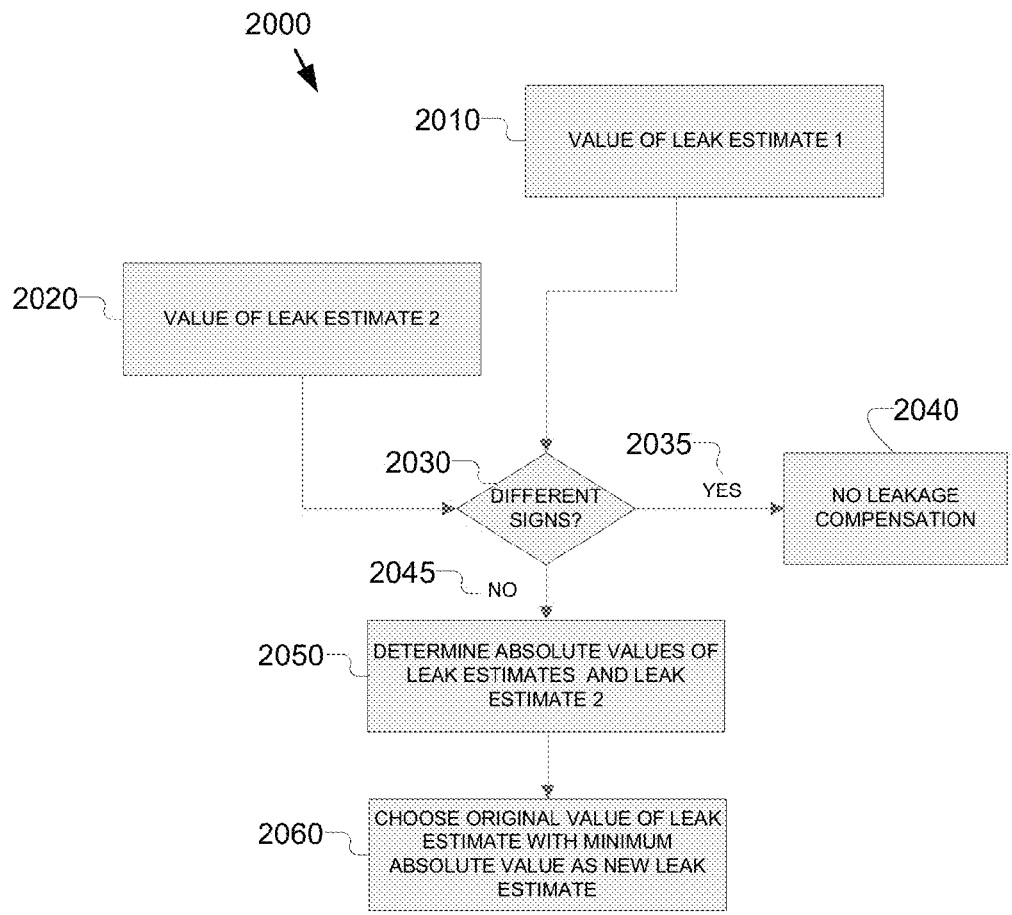
FIG. 20 is a flow diagram showing embodiments of determining decoder-side leakage using the decoder-side transformations of FIG. 19.
FIG. 21 is a pseudo-code implementation of determining decoder-side leakage.

With reference to FIG. 20, the following procedure may be used to combine multiple DC leakage estimates. The value of leak estimate 1 is determined 2010; (also see 1955 in FIG. 19). The value of leak estimate 2 is determined 2020 (also see 1960 in FIG. 19) At 2030, it is determined if the two leak estimates have different signs. If the two leak estimates, e.g., leak_estimate1 2010 and leak_estimate2 2020 have different signs 2035; that is, they do not agree in terms of the direction in which their application would alter the decoded values, then no leakage compensation is done 2040.

If the signs of the two leak estimates 2010, 2020 do match 2045, the absolute value of both estimates is taken 2050, the leak estimate with the minimum absolute value is determined, and then the original leak estimate value with the minimum absolute value is used 2060.

FIG. 21 shows, at 2010, one possible pseudo-code implementation of the procedure to determine the leak estimate.

2.C.2: Using Quantization Step Size

Figures 22, 23:
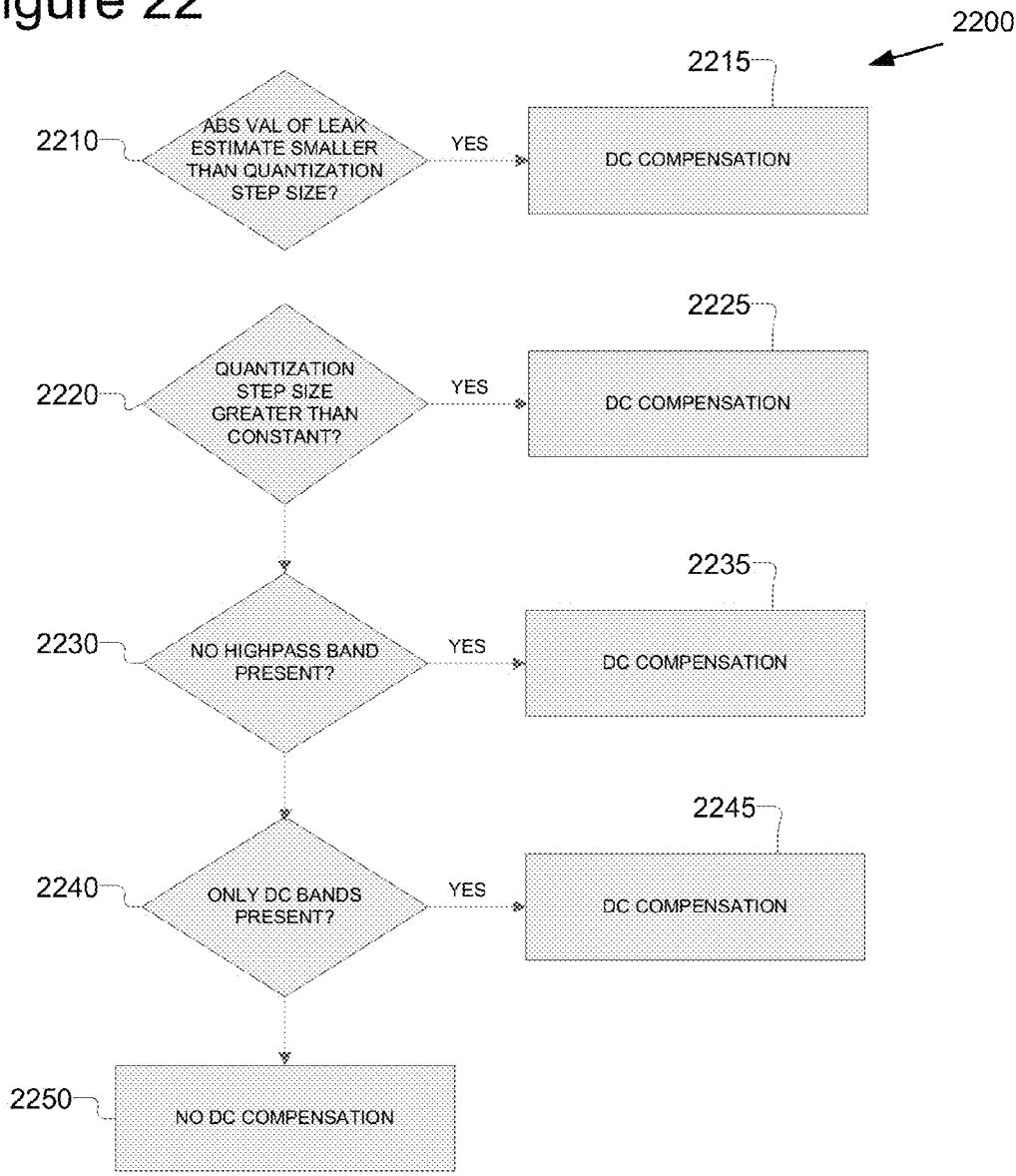
FIG. 22 is a flow diagram showing occasions when compensation for decoder-side leakage may occur.
FIG. 23 is an exemplary pseudocode implementation that may be used to determine if DC leak compensation should be used.

FIG. 22 at 2200 describes how, in some embodiments, leakage compensation is only performed in certain instances.

In some implementations, the value of the leak estimate (e.g, leak_estimate_new in FIG. 21, "the new leak estimate" at 2060 in FIG. 20) is compared against the quantization step size used to originally code the block (described, e.g., with reference to 330 in FIG. 3). If the leakage estimate is smaller than the quantization step size that was applied to the AC transform coefficients (or the quantization step size modified by one or more constants) 2210 then the leakage compensation is performed 2215.

In some implementations, if the quantization step size is greater than a predetermined constant 2220, then leakage compensation 2225 is performed. In some implementations, if only DC bands are present in the encoded representation 2230, then leakage compensation 2235 is performed. In some implementations, if there is no highpass band present in the encoded representation 2240, then leakage compensation 2455 is performed. These implementations may be mixed freely.

An exemplary pseudocode implementation is shown in FIG. 23.

Once a leakage estimate has been determined, it is subtracted from the a and p pixel values, and added to the d and m pixel values. A simple leakage compensation pseudocode implementation, with continuing reference to the matrix notation $$\begin{bmatrix} a & b & c & d \\ e & f & g & h \\ i & j & h & l \\ m & n & o & p \end{bmatrix},$$

is as follows:

a=a−leak_estimate_new
p=p−leak_estimate_new
d=d+leak_estimate_new
m=m+leak_estimate_new As this DC block compensation method is performed after the inverse POT 1955, 1960 (FIG. 19), the changes to a decoder required for implementation may not require modifying existing transforms.

2.D. Frequency Domain Coefficient Adjustment

Frequency domain coefficient adjustment can be performed in one of, e.g, two locations:

a) prior to the inverse POT scaling stage $T^1_S$ (a, p) (940, FIG. 9), or b) prior to the final inverse POT Hadamard Transform Stage (950, FIG. 9), and after the scaling stage.

Each of these approaches will be discussed, in turn.

2.D.1 Performing Frequency Domain Coefficient Adjustment Prior to the Inverse POT Scaling Stage.

With continuing reference to the matrix notation $$\begin{bmatrix} a & b & c & d \\ e & f & g & h \\ i & j & h & l \\ m & n & o & p \end{bmatrix},$$

to perform frequency domain coefficient prior to the inverse POT scaling stage 940, first, an estimate of the transform domain DC leakage from the variable a (in the frequency domain block), is made prior to the scaling stage $T^1{}_S$ (a, p) 940, as follows:

DC leakage is estimated by multiplying the value of variable a (in the frequency domain block) times the value β in the scaling matrix. In a current embodiment shown at 2.A, β=27/4096. If the absolute value of the DC leakage is less than the step size of the transform coefficient quantization process (or the step size multiplied by a constant), then the encoder side leakage is likely to have been quantized to 0; otherwise it is likely to have been preserved. If it is considered to have been preserved, then no adjustment is done. If it is considered to have been quantized to 0, then coefficient adjustment is performed.

An exemplary pseudocode implementation is shown below.

```
TformDomain_DC_leakage =a * (27/4096)
If (Abs(TformDomain_DC_leakage) < hp_step_size) {
    Perform coefficient adjustment
} else {
    No adjustment
}
```

To perform the coefficient adjustment, the value of Tform-Domain_DC_leakage is subtracted from the coefficient p before the scaling stage.

Exemplary pseudocode of the coefficient adjustment is shown below.

p_new=p−*T*formDomain_*DC*_leakage.

The scaling operator is then applied using the new p value; $T_S^1$ (a, p_new). This new p value is also used the in the remaining Hadamard transform stage.

2.D.2: Performing Frequency Domain Coefficient Adjustment Prior to the Final Inverse POT Hadamard Transform Stage (Stage 5), and after the Scaling Stage.

DC leakage can also be computed from the variable a after the scaling stage (940, FIG. 9) and before the Hadamard stage (950, FIG. 9), using the same method as shown, above, with reference to embodiment 2.D.1.

Other methods of calculating DC leakage value may be employed. Similarly, other methods of coefficient adjustment can also be performed in the transform domain after the scaling stage and before the Hadamard stage.

2.D.3: Altering the Inverse Transform if DC Leakage is Present.

Another approach to leakage compensation is to detect the presence of DC leakage by using the default inverse transform, and then to use a different inverse transform or inverse POT that can mitigate the DC leakage. A special case of this approach is to use a different inverse scaling stage (940, FIG. 9) if DC leakage is detected. For example, an inverse scaling stage whose inverse scaling matrix with off diagonal elements equal to zero can be used.

In particular, the following inverse scaling matrix can be used in the inverse POT to mitigate DC leakage $$\begin{bmatrix} 1.4519043 & 0 \\ 0 & 0.6887207 \end{bmatrix}$$

This scaling matrix can be approximated using lifting steps for implementation or by using other straightforward approaches.

2.E. Pre-Processing

Decoder side post-processing improves quality for large quantization step sizes (medium to low bit rates) where the encoder side DC leakage has been quantized to zero. In some instances, it does not improve compression capability for small quantization step sizes, where the effect of encoder side DC leakage leads to higher bit rates.

However, encoder side pre-processing in conjunction with decoder side post-processing can improve quality even with small quantization step sizes.

Figure 24:
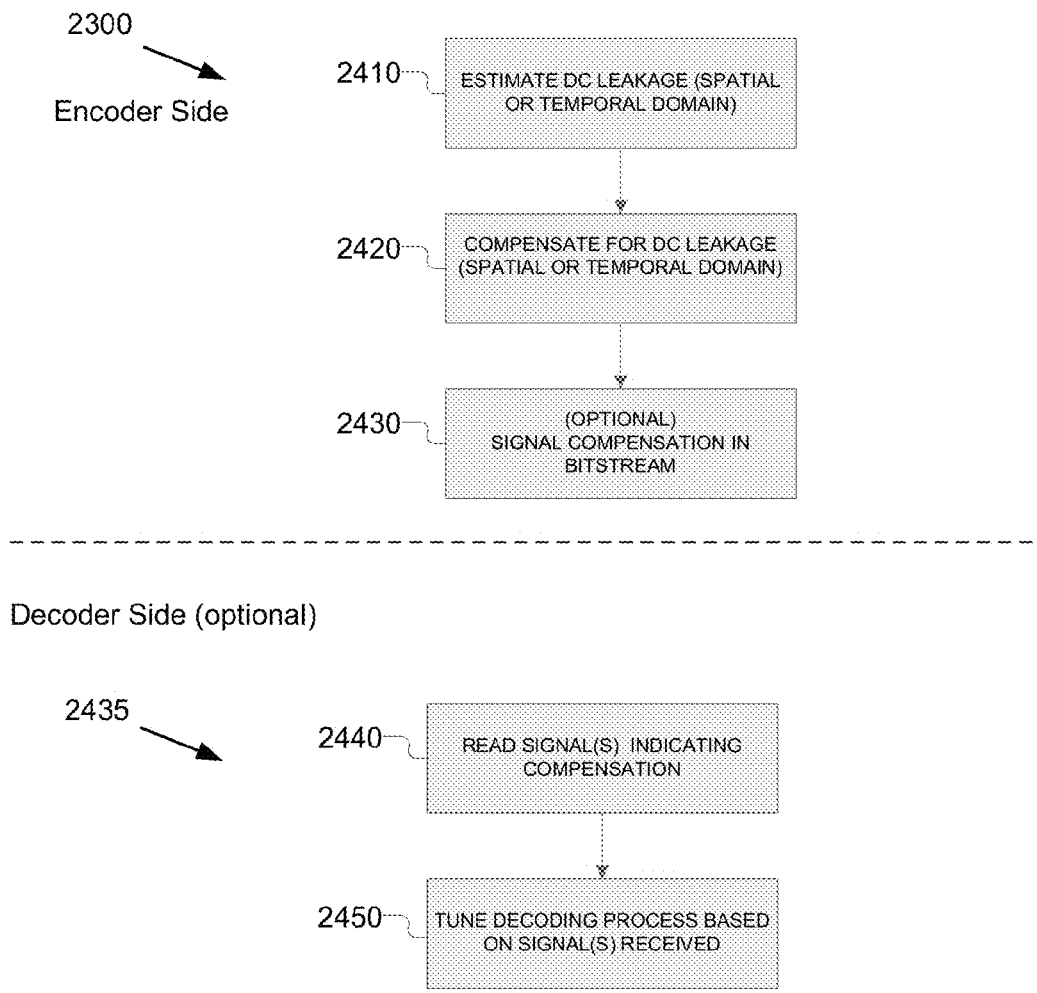
FIG. 24 is a flow diagram showing pre- and post-processing DC compensation embodiments.

FIG. 24 is a block diagram describing some pre- and post-processing techniques that can be used to mitigate DC leakage. To remove DC leakage using preprocessing 2400, in certain embodiments the encoder side DC leakage is estimated 2410, and then, during the forward POT (e.g., 800 at FIG. 8), compensation is made for the leakage 2320 (before the quantization process) at the encoder. The same methods can be used that have already described herein for determining DC leakage amounts and compensating for them. See, for example, see the embodiments discussed with reference to section 2C. Since the encoder has access to the original image, it can easily distinguish between the AC coefficients that have non-zero values due to signal statistics, and the AC coefficients that have non-zero values due to DC leakage.

If encoder side DC leakage is compensated, the AC coefficients that are incorrectly set to values other than zero due to DC leakage are eliminated, with the effect that there will be no additional non-zero encoded AC coefficients due to leakage, and hence the quantity of bits required for signaling these unnecessary coefficients are eliminated which improves the compression capability. Certain implementations do not require changes at the decoder.

Certain implementations also contain decoder-side processing 2435 based on such changes (e.g., 2300) which may then be used to then tune the decoding process. These implementations may signal in the bitstream 2430 indicating that encoder-side DC leakage has been compensated, and possibly indicating the sorts of compensation that have been performed. Such signaling may be done as discussed elsewhere in this document.

The DC leakage at the encoder can be estimated in the spatial domain using the pixel values just prior to beginning the POT process 805 (FIG. 8), as discussed with reference to the spatial post-processing embodiment, described with reference to 2.C.1, or in the frequency domain (e.g., 810-1850, FIG. 8) using the coefficients in the intermediate steps of the POT process, as discussed with reference to Frequency Coefficient adjustment embodiments; 2.D.1 "performing frequency domain coefficient adjustment prior to the Inverse POT scaling stage; 2.D.2, "performing frequency domain coefficient adjustment prior to the final Inverse POT hadamard transform stage and after the scaling stage;" and 2.D.3, "altering the inverse transform if DC leakage is present."

The compensation for the DC leakage can also be performed in the spatial domain (e.g., 805, FIG. 8) or in the transform domain (e.g., 810-850, FIG. 8). In some cases estimation is performed in one domain and the compensation is performed in the other domain. If the estimation is done in the spatial domain and the compensation is performed in the frequency domain, for example, then the estimate may need to be scaled or otherwise modified prior to using it for the compensation.

Another pre-processing approach is to use a different forward transform or POT operator when possible DC leakage is detected at the encoder. In particular, the forward scaling stage 820 may be derived as proposed in embodiment 2.D.3, "altering the inverse transform if DC leakage is present."

Other pre-processing approaches at the encoder include changing the quantization step size for the highpass band, and/or changing the dead-zone width or the value of the parameter trim flexbits.

The use of encoder pre-processing, such as any of the changes indicated above, may be signaled 2330 in the bitstream in the image header, tile header, frequency band header, or elsewhere. It may be signaled as meta-data information, as control parameters, as ancillary data, etc. It may be signaled at the image level, the tile level, the macroblock level, or at a different level. Any part of the encoder processing may generate such data. The decoder then reads the signal indicating that compensation has occurred at the encoder 2340, and then uses this information to tune the post-processing algorithm 2350. Any portion of the decoder may make use of such data.

As one example, the post-processing stage that computes the effect of quantization on DC leakage may use pre-processing information signaled in the bitstream to determine that the encoder side DC leakage has been set to zero, even with a small quantization step size, due to the application of the encoder pre-processing. The decoder may then make decisions based on this knowledge.

3. Computing Environment

The above described DC leakage mitigation/removal systems and methods can be performed on any of a variety of devices in which digital media signal processing is performed, including among other examples, computers, image and video recording, transmission and receiving equipment, portable video players, video conferencing, etc. The digital media coding techniques can be implemented in hardware circuitry, as well as in digital media processing software executing within a computer or other computing environment, such as shown in FIG. 5.

Figure 25:
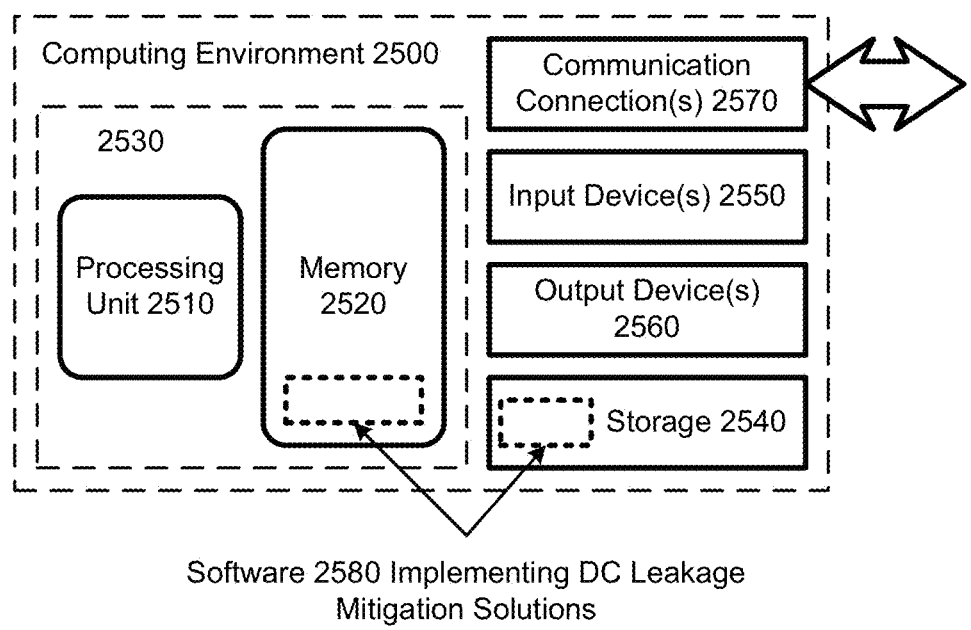
FIG. 25 is a block diagram of a suitable computing environment for implementing the DC leakage reduction systems and methods as can be implemented using techniques taught herein.

FIG. 25 illustrates a generalized example of a suitable computing environment (2500) in which described embodiments may be implemented. The computing environment (2500) is not intended to suggest any limitation as to scope of use or functionality of the invention, as the present invention may be implemented in diverse general-purpose or special-purpose computing environments.

With reference to FIG. 25, the computing environment (2500) includes at least one processing unit (2510) and memory (2520). In FIG. 25, this most basic configuration (2530) is included within a dashed line. The processing unit (2510) executes computer-executable instructions and may be a real or a virtual processor. In a multi-processing system, multiple processing units execute computer-executable instructions to increase processing power. The memory (2520) may be volatile memory (e.g., registers, cache, RAM), non-volatile memory (e.g., ROM, EEPROM, flash memory, etc.), or some combination of the two. The memory (2520) stores software (2580) implementing the described encoder/decoder and transforms which reduce DC leakage.

A computing environment may have additional features. For example, the computing environment (2500) includes storage (2540), one or more input devices (2550), one or more output devices (2560), and one or more communication connections (2570). An interconnection mechanism (not shown) such as a bus, controller, or network interconnects the components of the computing environment (2500). Typically, operating system software (not shown) provides an operating environment for other software executing in the computing environment (2500), and coordinates activities of the components of the computing environment (2500).

The storage (2540) may be removable or non-removable, and includes magnetic disks, magnetic tapes or cassettes, CD-ROMs, CD-RWs, DVDs, or any other medium which can be used to store information and which can be accessed within the computing environment (2500). The storage (2540) stores instructions for the software (2580) implementing the DC leakage removal solutions.

The input device(s) (2550) may be a touch input device such as a keyboard, mouse, pen, or trackball, a voice input device, a scanning device, or another device that provides input to the computing environment (2500). For audio, the input device(s) (2550) may be a sound card or similar device that accepts audio input in analog or digital form, or a CD-ROM reader that provides audio samples to the computing environment. The output device(s) (2560) may be a display, printer, speaker, CD-writer, or another device that provides output from the computing environment (2500).

The communication connection(s) (2570) enable communication over a communication medium to another computing entity. The communication medium conveys information such as computer-executable instructions, compressed audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The digital media processing techniques herein can be described in the general context of computer-readable media. Computer-readable media are any available media that can be accessed within a computing environment. By way of example, and not limitation, with the computing environment (2500), computer-readable media include memory (2520), storage (2540), and combinations of any of the above.

The digital media processing techniques herein can be described in the general context of computer-executable instructions, such as those included in program modules, being executed in a computing environment on a target real or virtual processor. Generally, program modules include routines, programs, libraries, objects, classes, components, data structures, etc., that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "determine," "generate," "adjust," and "apply" to describe computer operations in a computing environment. These terms are high-level abstractions for operations performed by a computer, and should not be confused with acts performed by a human being. The actual computer operations corresponding to these terms vary depending on implementation.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A method of mitigating effect of DC leakage in an inverse lapped transform used to decode digital media comprising:
by a computing device:
computing an amount of DC leakage using a DC value of a frequency domain block and a value of a scaling matrix used in the inverse lapped transform;
estimating an effect of DC leakage on the frequency domain block within the inverse_lapped transform using quantization step size as a first estimate;
adding the amount of DC leakage to at least one coefficient in the frequency domain block to produce a new coefficient value; and
performing a scaling operation within the inverse lapped transform using the new coefficient value.

2. The method of claim 1 further comprising estimating an effect of DC leakage on the frequency domain block within the inverse lapped transform using values of a scaling matrix associated with the scaling operation as a second estimate.

3. The method of claim 2 further comprising performing DC leakage mitigation only if a value of the first estimate and a value of the second estimate are of the same sign.

4. A method of mitigating effect of DC leakage in a lapped transform used to encode digital media comprising:
by a computing device:
computing an amount of DC leakage using a DC value of a frequency domain block and a value of a scaling matrix used in the lapped transform;
estimating an effect of DC leakage on the frequency domain block within the lapped transform using quantization step size as a first estimate;
adding the amount of DC leakage to at least one coefficient in the frequency domain block to produce a new coefficient value; and
performing a scaling operation within the lapped transform using the new coefficient value.

5. The method of claim 4 further comprising estimating an effect of DC leakage on the frequency domain block within the lapped transform using values of a scaling matrix associated with the scaling operation as a second estimate.

6. The method of claim 4 further comprising performing DC leakage mitigation only if a value of the first estimate and a value of the second estimate are of the same sign.

7. A digital media decoder, comprising:
a data storage buffer for storing digital media data to be decoded; and
a processor programmed to:
compute an amount of DC leakage using a DC value of a frequency domain block and a value of a scaling matrix used in an inverse lapped transform;
estimate an effect of DC leakage on the frequency domain block within the inverse lapped transform using quantization step size as a first estimate;
add the amount of DC leakage to at least one coefficient in the frequency domain block to produce a new coefficient value; and
perform a scaling operation within the inverse lapped transform using the new coefficient value.

8. The decoder of claim 7, wherein the processor is further programmed to estimate an effect of DC leakage on the frequency domain block within the inverse lapped transform using values of a scaling matrix associated with the scaling operation as a second estimate.

9. The decoder of claim 8, wherein the processor is further programmed to perform DC leakage mitigation only if a value of the first estimate and a value of the second estimate are of the same sign.

10. A digital media encoder, comprising:
a data storage buffer for storing digital media data to be encoded; and
a processor programmed to:
compute an amount of DC leakage using a DC value of a frequency domain block and a value of a scaling matrix used in a lapped transform;
estimate an effect of DC leakage on the frequency domain block within the lapped transform using quantization step size as a first estimate;
add the amount of DC leakage to at least one coefficient in the frequency domain block to produce a new coefficient value; and
perform a scaling operation within the lapped transform using the new coefficient value.

11. The encoder of claim 10 wherein the processor is further programmed to estimate an effect of DC leakage on the frequency domain block within the lapped transform using values of a scaling matrix associated with the scaling operation as a second estimate.

12. The encoder of claim 11 wherein the processor is further programmed to perform DC leakage mitigation only if a value of the first estimate and a value of the second estimate are of the same sign.

13. A computer-readable memory or magnetic disk storing computer-executable instructions which when executed by a computer cause the computer to perform a method, the method comprising:
computing an amount of DC leakage using a DC value of a frequency domain block and a value of a scaling matrix used in an inverse lapped transform;
estimating an effect of DC leakage on the frequency domain block within the inverse lapped transform using quantization step size as a first estimate;
adding the amount of DC leakage to at least one coefficient in the frequency domain block to produce a new coefficient value; and
performing a scaling operation within the inverse lapped transform using the new coefficient value.

14. A computer-readable memory or magnetic disk storing computer-executable instructions which when executed by a computer cause the computer to perform a method, the method comprising:
computing an amount of DC leakage using a DC value of a frequency domain block and a value of a scaling matrix used in a lapped transform;
estimating an effect of DC leakage on the frequency domain block within the lapped transform using quantization step size as a first estimate;

adding the amount of DC leakage to at least one coefficient in the frequency domain block to produce a new coefficient value; and performing a scaling operation within the lapped transform using the new coefficient value.

\* \* \* \* \*